(12) United States Patent
Nakazono

(10) Patent No.: US 9,609,215 B2
(45) Date of Patent: Mar. 28, 2017

(54) MOVING-IMAGE RECORDING/REPRODUCTION APPARATUS

(71) Applicant: OLYMPUS CORPORATION, Tokyo (JP)

(72) Inventor: Keisuke Nakazono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/728,337

(22) Filed: Jun. 2, 2015

(65) Prior Publication Data

US 2015/0365597 A1    Dec. 17, 2015

(30) Foreign Application Priority Data

Jun. 12, 2014  (JP) ................... 2014-121529

(51) Int. Cl.
*H04N 5/228*    (2006.01)
*H04N 5/222*    (2006.01)
*H04N 5/232*    (2006.01)

(52) U.S. Cl.
CPC .............................. *H04N 5/23245* (2013.01)

(58) Field of Classification Search
CPC .. H04N 9/045; H04N 2101/00; H04N 5/3742; H04N 1/2112; H04N 1/215; H04N 2201/0084; H04N 5/232; H04N 5/23209; H04N 5/23245; H04N 5/23248; H04N 5/23254; H04N 5/23261; H04N 5/23267; G03B 13/36
USPC ........ 348/220.1, 222.1, 333.05, 333.11, 345, 348/349
See application file for complete search history.

(56) References Cited

U.S. PATENT DOCUMENTS

| 7,773,048 B2 | 8/2010 | Shiraishi |
| 2004/0141067 A1* | 7/2004 | Nakayama ........... H04N 1/0411 348/222.1 |

(Continued)

FOREIGN PATENT DOCUMENTS

| JP | 2005-184095 A | 7/2005 |
| JP | 2006-53527 A | 2/2006 |
| JP | 2013-162425 A | 8/2013 |

*Primary Examiner* — Trung Diep
(74) *Attorney, Agent, or Firm* — Westerman, Hattori, Daniels & Adrian, LLP

(57) ABSTRACT

A moving-image recording/reproduction apparatus includes a first image processing apparatus configured to divide a region of an image signal into first and second regions when the image signal of each frame in a high-resolution moving image is input and generate first moving-image data by performing moving-image processing on the image signal of the first region and a second image processing apparatus configured to generate second moving-image data by performing the moving-image processing on the image signal of the second region. High-resolution moving-image data corresponding to the high-resolution moving-image obtained by combining the first and second moving-image data and low-resolution moving-image data corresponding to a low-resolution moving image having the same angle of view as the high-resolution moving image generated by the first or second image processing apparatuses are associated and recorded and the high- or low-resolution moving-image data is selected according to an image resolution that can be displayed.

6 Claims, 7 Drawing Sheets

(56) References Cited

U.S. PATENT DOCUMENTS

| | | | |
|---|---|---|---|
| 2005/0068455 A1* | 3/2005 | Hatano | H04N 5/23212 348/345 |
| 2006/0092269 A1* | 5/2006 | Baird | H04L 12/1822 348/14.08 |
| 2008/0030590 A1* | 2/2008 | Ciudad | H04N 7/147 348/211.12 |
| 2009/0059031 A1* | 3/2009 | Miyakoshi | H04N 3/155 348/222.1 |

* cited by examiner

MOVING-IMAGE RECORDING/REPRODUCTION APPARATUS

BACKGROUND OF THE INVENTION

Field of the Invention

The present invention relates to a moving-image recording/reproduction apparatus. Priority is claimed on Japanese Patent Application No. 2014-121529, filed Jun. 12, 2014, the content of which is incorporated herein by reference.

Description of Related Art

An imaging apparatus such as a still-image camera or a moving-image camera generally has a moving-image function to serve as a moving-image recording/reproduction apparatus configured to record and reproduce a moving image. The moving-image function in the imaging apparatus is implemented through the moving-image recording/reproduction apparatus configured within an image processing block in which image processing is performed in the imaging apparatus.

In recent years, high definition of a display device such as a television (TV) has progressed and, for example, high definition televisions (HDTVs) of a full HD (1920×1080) resolution as the high-definition improvement for TVs having a conventional video graphics array (VGA) (640×480) resolution have become the mainstream. In addition, recently, UHDTVs (ultra high definition televisions) having a higher definition such as 4K2K (3840×2160) resolution have also been commercialized. Thus, even in the moving-image function of the moving-image recording/reproduction apparatus, the support for the recording and reproduction of a high-definition moving image having the 4K2K resolution or the like has progressed.

However, processing by a moving-image codec of very high specs is required to implement a function of recording or reproducing a moving image in full HD or more. Here, for example, the case in which a process for moving images at 60 frames/sec (fps) in full HD is considered to be associated with a moving image having the 4K2K resolution at a frame rate (that is, 60 fps) without change is considered. In this case, the number of pixels on which the image processing is performed in the moving image having the 4K2K resolution is four times that in the moving image in full HD. Thus, a frequency of a clock (operation clock) when the moving-image codec processes the moving image having the 4K2K resolution is also required to be a frequency four times that in full HD. Then, when a configuration in which the moving-image codec is provided in one image processing apparatus for implementing the moving-image function in the moving-image recording/reproduction apparatus is made, not only power consumption increases in association with an increase in the frequency of the operation clock of the moving-image codec, but also the cost increases in association with an increase in a circuit scale of the moving-image codec in this image processing apparatus.

In addition, not all moving-image recording/reproduction apparatuses support moving images having the 4K2K resolution. Thus, developing the image processing apparatus having a moving-image codec having high specs as an image processing apparatus to be mounted on the moving-image recording/reproduction apparatus also leads to an increase in the cost of the moving-image recording/reproduction apparatus and is not a realistic method. Because of this, a configuration corresponding to a moving image having the 4K2K resolution by mounting two (or more) image processing apparatuses, each of which divides a moving image and processes the divided moving image, in the moving-image recording/reproduction apparatus corresponding to a moving image having the 4K2K resolution is considered.

For example, in the publication of Japanese Unexamined Patent Application, First Publication No. 2013-162425, technology in which two image processing units are mounted on an imaging apparatus and the image processing units simultaneously record two moving images having different angles of view or photographing positions is disclosed. In the technology disclosed in the publication of Japanese Unexamined Patent Application, First Publication No. 2013-162425, it is possible to display moving images on one display device by superimposing simultaneously recorded moving images.

In addition, for example, in the publication of Japanese Unexamined Patent Application, First Publication No. 2006-053527, technology of a display processing apparatus for dividing the entire region of one frame in a moving image into a plurality of regions and processing the plurality of regions in parallel is disclosed. In the technology disclosed in the publication of Japanese Unexamined Patent Application, First Publication No. 2006-053527, two display processing units are provided within the display processing apparatus, a region of a moving image of one frame to be displayed is divided into a left region and a right region, and the display processing units process a moving image of a left half and a moving image of a right half in parallel. Then, in the technology disclosed in the publication of Japanese Unexamined Patent Application, First Publication No. 2006-053527, the two display processing units corresponding to the regions cause the display device to which two image signals can be input in parallel to display the entire moving image of one frame by inputting processed image signals in parallel.

The moving-image recording/reproduction apparatus in which a plurality of image processing apparatuses process a high-definition moving image having the 4K2K resolution or the like by combining the technology disclosed in the publication of Japanese Unexamined Patent Application, First Publication No. 2013-162425 and the technology disclosed in the publication of Japanese Unexamined Patent Application, First Publication No. 2006-053527 and applying the combined technologies to the moving-image recording/reproduction apparatus is considered to be capable of being implemented. For example, the moving-image recording/reproduction apparatus is configured to have two image processing apparatuses including a moving-image codec corresponding to full HD. Then, a region of a moving image having the 4K2K resolution of one frame to be recorded, for example, is divided into left and right regions and the image processing apparatuses process moving images of the two regions simultaneously (in parallel). That is, one image processing apparatus provided in the moving-image recording/reproduction apparatus processes a left-half moving image and the other image processing apparatus processes a right-half moving image. Thereby, it is possible to record the left-half moving image and the right-half moving image in the moving image having the 4K2K resolution compressed (encoded) through the moving-image codecs provided in the image processing apparatuses simultaneously (in parallel). Then, the moving-image codec provided in each image processing apparatus causes the moving image having the 4K2K resolution to be displayed by decompressing (decoding) the moving images of the two recorded divisions in parallel and outputting the decompressed (decoded) moving images to the display device to which the two image signals can be input in parallel.

At this time, the image processing apparatus provided in the moving-image recording/reproduction apparatus has one moving-image codec corresponding to a resolution, for example, full HD resolution, which is smaller than the 4K2K resolution without having one moving-image codec corresponding to the moving image having the 4K2K resolution. Thus, it is possible to suppress an increase in a frequency of an operation clock of the moving-image codec provided in each image processing apparatus and suppress an increase in power consumption or cost of the image processing apparatus. Even when each image processing apparatus processes the moving image having the 4K2K resolution so as to process only one moving image of two left and right moving images into which the moving image having the 4K2K resolution is divided, that is, process a moving image of a region of ½, the frequency of the operation clock of the moving-image codec provided in each image processing apparatus becomes better at a frequency of ½ of the moving-image codec corresponding to the moving image having the 4K2K resolution.

The moving-image recording/reproduction apparatus has a function of displaying a moving image on a display device mounted on the moving-image recording/reproduction apparatus as well as displaying the moving image on an external display device connectable to the moving-image recording/reproduction apparatus. Here, there is, for example, a thin film transistor (TFT) liquid crystal display (LCD), an electronic view finder (EVF), or the like as the display device mounted on the moving-image recording/reproduction apparatus. Also, there is an external display such as a TFT monitor or an organic electro luminescence (EL) display in addition to the above-described TV as the external display device connectable to the moving-image recording/reproduction apparatus.

In this manner, there are various types of display devices having different frame rates or resolutions as the display device that displays the moving image by the moving-image recording/reproduction apparatus. Thus, there is a need for support so that moving images can be displayed on various types of display devices in the moving-image function in the moving-image recording/reproduction apparatus. That is, a process of performing combined display on display devices having different frame rates or resolutions is required.

However, the technology disclosed in the publication of Japanese Unexamined Patent Application, First Publication No. 2013-162425 enables two moving images having different view angles or photographing positions to be simultaneously recorded, but is not, for example, technology for simultaneously processing moving images having different resolutions, that is, a high-resolution moving image and a low-resolution moving image. In addition, the technology disclosed in the publication of Japanese Unexamined Patent Application, First Publication No. 2006-053527 is also technology for processing moving-images of divisions in parallel, but is not, for example, technology for processing moving images having different resolutions.

For example, in the publication of Japanese Unexamined Patent Application, First Publication No. 2005-184095, technology for recording a moving image at low image quality (low resolution) regularly and recording only an important scene at high image quality (high resolution) is disclosed. In the technology disclosed in the publication of Japanese Unexamined Patent Application, First Publication No. 2005-184095, it is possible to easily search for a high-resolution moving image when a moving image is reproduced at low image quality.

However, the technology disclosed in the publication of Japanese Unexamined Patent Application, First Publication No. 2005-184095 is not technology for simultaneously recording a low-resolution moving image and a high-resolution moving image. Thus, in the technology disclosed in the publication of Japanese Unexamined Patent Application, First Publication No. 2005-184095, moving images having different resolutions are configured to be displayed on the same display device according to time.

Thus, in the moving-image recording/reproduction apparatus to which the technology disclosed in the publication of Japanese Unexamined Patent Application, First Publication No. 2013-162425 and the technology disclosed in the publication of Japanese Unexamined Patent Application, First Publication No. 2006-053527 are combined to be applied, a process of generating one moving image by temporarily combining moving images of divisions is performed after the moving images recorded in two divisions are decoded when the moving image recorded at high resolution is displayed on a display device which displays a low-resolution image. Then, after image processing such as a reduction process of converting each frame of one combined moving image into a resolution corresponding to a low-resolution display device is performed, each frame of a reduced moving image is displayed on the display device. That is, in the moving-image recording/reproduction apparatus to which the technology disclosed in the publication of Japanese Unexamined Patent Application, First Publication No. 2013-162425 and the technology disclosed in the publication of Japanese Unexamined Patent Application, First Publication No. 2006-053527 are combined to be applied, two image processing apparatuses provided in the moving-image recording/reproduction apparatus are configured to operate simultaneously (in parallel) even when the moving image is displayed on the display device which displays a low-resolution image.

In addition, in the moving-image recording/reproduction apparatus to which the technology disclosed in the publication of Japanese Unexamined Patent Application, First Publication No. 2013-162425 and the technology disclosed in the publication of Japanese Unexamined Patent Application, First Publication No. 2006-053527 are combined to be applied, for example, a process of combining moving images decoded by moving-image codecs within the image processing apparatuses or a process of converting the resolution is performed after an instruction for reproducing the moving image is input by a user of the moving-image recording/reproduction apparatus pressing a reproduction button or the like. Thus, in the moving-image recording/reproduction apparatus, a time required for each process becomes a delay time from when the moving-image reproduction instruction is input to when the moving image is actually displayed on the display device. At this time, in the moving-image recording/reproduction apparatus to which the technology disclosed in the publication of Japanese Unexamined Patent Application, First Publication No. 2013-162425 and the technology disclosed in the publication of Japanese Unexamined Patent Application, First Publication No. 2006-053527 are combined to be applied, it is necessary to transmit and receive moving-image data between the image processing apparatuses so that the two image processing apparatuses process corresponding moving images simultaneously (in parallel) and a transmission time of the moving-image data is also added to a delay time from the input of the moving-image reproduction instruction to the display of the moving image on the display device. Thus, in the moving-image recording/reproduction apparatus to which the technology disclosed in the publication of Japanese Unexamined Patent Application, First Publication No. 2013-162425 and the technology disclosed in the publication of Japanese Unexamined Patent Application, First Publication No. 2006-053527 are combined to be applied, the delay time (time lag) from the input of the moving-image reproduction instruction to the display of the moving image on the display device increases and a display response is delayed even when the low-resolution moving image is displayed on the display device.

SUMMARY OF THE INVENTION

According to a first aspect of the present invention, a moving-image recording/reproduction apparatus includes: a first image processing apparatus which is an image processing apparatus configured to divide a region of an image signal into first and second regions when the image signal of each frame in a high-resolution moving image is input and generate first moving-image data by performing moving-image processing on the image signal of the first region; and a second image processing apparatus which is an image processing apparatus configured to generate second moving-image data by performing the moving-image processing on the image signal of the second region, wherein high-resolution moving-image data corresponding to the high-resolution moving-image obtained by combining the first and second moving-image data and low-resolution moving-image data corresponding to a low-resolution moving image having the same angle of view as the high-resolution moving image generated by at least one of the first and second image processing apparatus are associated and recorded, and wherein either the recorded high- or low-resolution moving-image data is selected according to an image resolution that is capable of being displayed by a connected display device.

According to a second aspect of the present invention, in the moving-image recording/reproduction apparatus according to the first aspect, when the moving image based on the low-resolution moving-image data is displayed on the display device, the moving image based on the low-resolution moving-image data may be generated to be displayed on the display device through either the first or the second image processing apparatus.

According to a third aspect of the present invention, in the moving-image recording/reproduction apparatus according to the second aspect, a region of the image signal may be divided into the first and second regions at predetermined proportions, and the first image processing apparatus and the second image processing apparatus may perform the moving-image processing on the image signal of a corresponding region in parallel.

According to a fourth aspect of the present invention, in the moving-image recording/reproduction apparatus according to the third aspect, the image processing apparatus, which also generates the low-resolution moving-image data, may generate the low-resolution moving-image data based on an image signal obtained by reducing the number of pixels from the image signal in the high-resolution moving image after the moving-image processing to be performed on the image signal of the corresponding region ends.

According to a fifth aspect of the present invention, in the moving-image recording/reproduction apparatus according to the third aspect, the proportions at which the region of the image signal may be divided into the first and second regions are set to be non-uniform, and the image processing apparatus corresponding to a region having a smaller number of image signals included in the first and second regions may generate the low-resolution moving-image data based on an image signal obtained by reducing the number of pixels from the image signal in the high-resolution moving image.

According to a sixth aspect of the present invention, in the moving-image recording/reproduction apparatus according to the fifth aspect, only either the first or the second image processing apparatus may determine the proportions at which the region of the image signal is divided into the first and second regions so as to generate the low-resolution moving-image data.

According to a seventh aspect of the present invention, in the moving-image recording/reproduction apparatus according to the fourth aspect, the proportions at which the region of the image signal may be divided into the first and second regions are set to be non-uniform, and the image processing apparatus corresponding to a region having a smaller number of image signals included in the first and second regions may generate the low-resolution moving-image data based on an image signal obtained by reducing the number of pixels from the image signal in the high-resolution moving image.

According to an eighth aspect of the present invention, in the moving-image recording/reproduction apparatus according to the seventh aspect, only either the first or the second image processing apparatus may determine the proportions at which the region of the image signal is divided into the first and second regions so as to generate the low-resolution moving-image data.

DETAILED DESCRIPTION OF THE INVENTION

Figure 1:
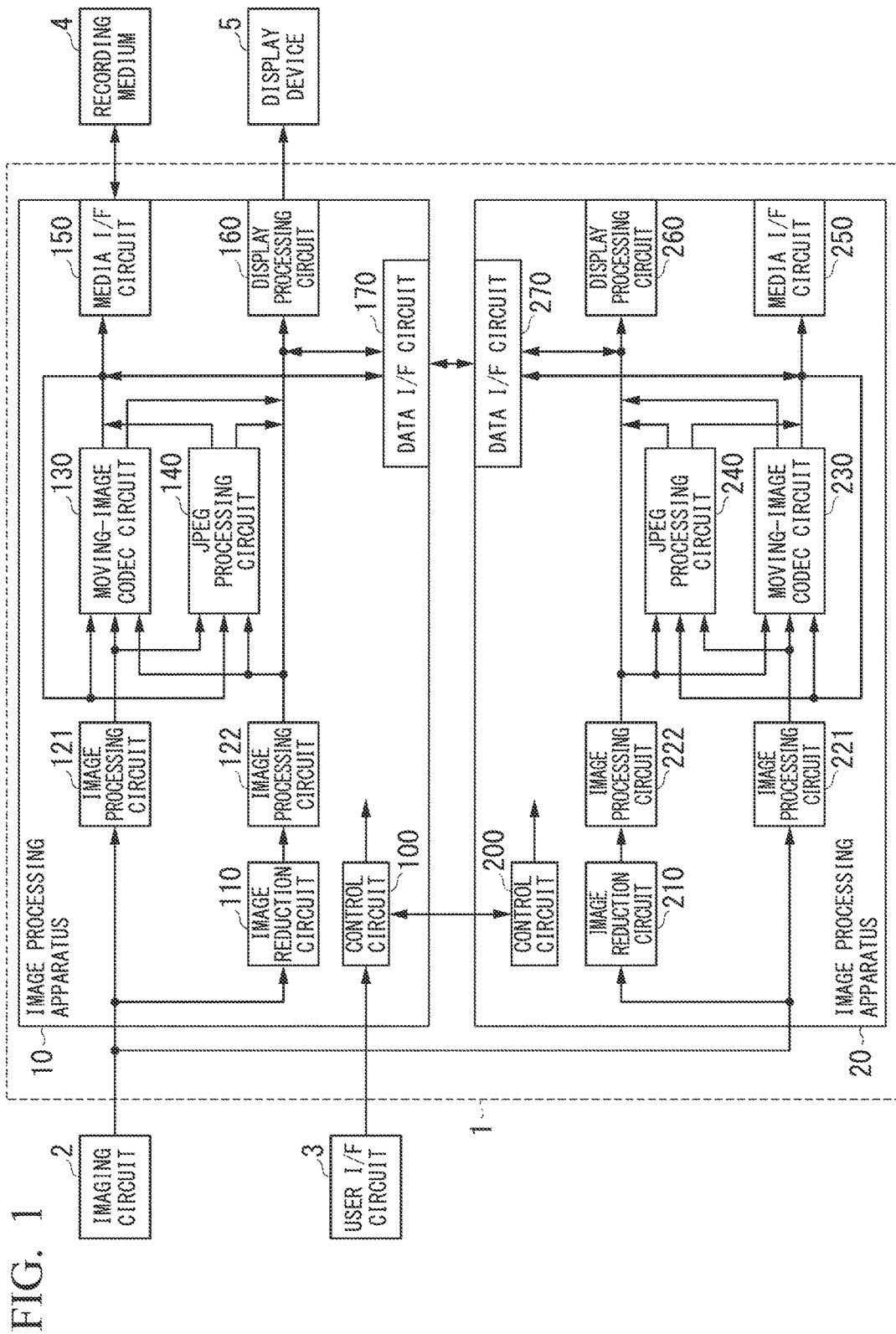
FIG. 1 is a block diagram showing an example of a configuration of a system equipped with a moving-image recording/reproduction apparatus in an embodiment of the present invention.

Hereinafter, an embodiment of the present invention will be described with reference to the drawings. FIG. 1 is a block diagram showing an example of a configuration of a system equipped with a moving-image recording/reproduction apparatus in this embodiment. Also, the configuration of the system to which the moving-image recording/reproduction apparatus of this embodiment is applied is not limited. In FIG. 1, the configuration in which the moving-image recording/reproduction apparatus of this embodiment is applied to the system (hereinafter referred to as an "imaging system") of the imaging apparatus is showed.

The moving-image recording/reproduction apparatus 1 includes two image processing apparatuses (image processing apparatuses 10 and 20). In addition, in FIG. 1, an imaging circuit 2, a user interface (I/F) circuit 3, a recording medium 4, and a display device 5 provided in the imaging system equipped with the moving-image recording/reproduction apparatus 1 are also showed. The moving-image recording/reproduction apparatus 1 records a moving image captured by the imaging circuit 2 on the recording medium 4. In addition, the moving-image recording/reproduction apparatus 1 causes the display device 5 to display the moving image recorded on the recording medium 4.

The imaging circuit 2 is an image sensor represented by a charge coupled device (CCD) image sensor for photoelectrically converting an optical image of an object formed by a lens (not showed) or a complementary metal-oxide semiconductor (CMOS) image sensor. As an input circuit for inputting a high-resolution moving image to the moving-image recording/reproduction apparatus 1, the imaging circuit 2 outputs an image signal of each frame in a moving image captured according to object light to the moving-image recording/reproduction apparatus 1.

The imaging circuit 2 may have a configuration including a pre-processing circuit for performing pre-processing such as flaw correction or shading correction on an image signal output by the image sensor. In this case, the imaging circuit 2 outputs the image signal of each frame after the pre-processing is performed on the moving-image recording/reproduction apparatus 1. The imaging circuit 2 can also output the image signal in a captured still image.

The recording medium 4 is a recording circuit configured to record image data of a moving image output by the moving-image recording/reproduction apparatus 1. In addition, as an input circuit for inputting image data of a moving image (a high-resolution moving image or a low-resolution moving image) to the moving-image recording/reproduction apparatus 1, the recording medium 4 outputs image data of a recorded moving image to the moving-image recording/reproduction apparatus 1. The recording medium 4, for example, includes recording media such as a secure digital (SD) memory card and CompactFlash (CF) (registered trademark).

Although the recording medium 4 is also a component of the imaging system in FIG. 1, the recording medium 4 may be configured to be detachable from the imaging system. In addition, the recording medium 4 may be provided as a component of the moving-image recording/reproduction apparatus 1.

The display device 5, for example, is a display device such as a TFT LCD or an organic EL display for displaying a moving image of each frame output by the moving-image recording/reproduction apparatus 1. The display device 5 is a display device for displaying an image having the number of pixels smaller than the number of pixels of the high-resolution moving image captured by the imaging circuit 2, i.e., displaying the low-resolution image. The display device 5 also functions as an EVF for finding a moving image captured through the imaging system.

Although the display device 5 also serves as a component of the imaging system in FIG. 1, the display device 5 may have a configuration detachable from the imaging system. In this case, for example, an HDTV for displaying an image of a resolution of full HD (1920×1080) or a TV (UHDTV) for displaying an image of a 4K2K (3840×2160) resolution can also be used as the display device 5.

The user I/F circuit 3 is an operation member having a button, a switch, or the like to be operated by a user of the imaging system. By operating the user I/F circuit 3, the user, for example, sets an operation mode of the imaging system such as an operation mode in which the moving image captured by the imaging circuit 2 is recorded on the recording medium 4 or an operation mode in which the moving image recorded on the recording medium 4 is displayed on the display device 5. The user I/F circuit 3 outputs information of the operation mode of the imaging system set according to the user's operation to the moving-image recording/reproduction apparatus 1. The user I/F circuit 3 not only may include buttons or switches, but also may include, for example, a touch pad or a touch panel along with the display device 5.

As described above, the moving-image recording/reproduction apparatus 1 includes two image processing apparatuses including image processing apparatuses 10 and 20 and performs predetermined image processing on a moving image input from the input circuit (the imaging circuit 2 or the recording medium 4) for inputting the moving image to the moving-image recording/reproduction apparatus 1. At this time, the image processing apparatuses 10 and 20 configuring the moving-image recording/reproduction apparatus 1 cooperatively operate in parallel and implement a moving-image function in the moving-image recording/reproduction apparatus 1.

The image processing apparatus 10 includes a control circuit 100, an image reduction circuit 110, an image processing circuit 121, an image processing circuit 122, a moving-image codec circuit 130, a joint photographic experts group (JPEG) processing circuit 140, a media I/F circuit 150, a display processing circuit 160, and a data I/F circuit 170.

The image reduction circuit 110 generates an image signal of each frame of a moving image having a smaller number of pixels at the same angle of view as the moving image input from the imaging circuit 2 by performing a resizing process, for example, such as a thinning process, on an image signal of each frame in the high-resolution moving image input from the imaging circuit 2. In addition, the image reduction circuit 110 outputs the generated image signal of each frame as the image signal of each frame in the low-resolution moving image to the image processing circuit 122. Also, even when a high-resolution still image is input from the imaging circuit 2, the image reduction circuit 110 similarly outputs an image signal obtained by performing the resizing process to the image processing circuit 122.

The image processing circuit 121 generates the image data of each frame of the high-resolution moving image by performing various types of image processing such as noise cancellation and YC conversion processing on the image signal of each frame in the high-resolution moving image input from the imaging circuit 2. Then, the image processing circuit 121 outputs the generated image signal of each frame to the moving-image codec circuit 130 and the JPEG processing circuit 140. Even when a high-resolution still image has been input from the imaging circuit 2, the image processing circuit 121 similarly generates image data by performing the image processing and outputs the generated image data to the moving-image codec circuit 130 and the JPEG processing circuit 140.

Similar to the image processing circuit 121, the image processing circuit 122 generates the image data of each frame of the low-resolution moving image by performing various types of image processing such as noise cancellation and YC conversion processing on the image signal of each frame in the low-resolution moving image input from the image reduction circuit 110. Then, the image processing circuit 122 outputs the generated image data of each frame to the moving-image codec circuit 130 and the JPEG processing circuit 140. Even when the image signal obtained by performing the resizing process on the high-resolution still image input from the imaging circuit 2 has been input from the image reduction circuit 110, the image processing circuit 122 generates image data by performing image processing as in the image processing circuit 121 and outputs the generated image data to the moving-image codec circuit 130 and the JPEG processing circuit 140.

The moving-image codec circuit 130 generates moving-image data used for recording by performing various types of moving-image compression processes (encoding) for recording a moving image such as a moving picture experts group (MPEG) compression process and an H.264 compression process on the image data of each frame in the moving image input from the image processing circuit 121 or 122. Then, the moving-image codec circuit 130 causes the recording medium 4 to record the generated moving-image data used for recording via the media I/F circuit 150. In addition, the moving-image codec circuit 130 can transmit the generated moving-image data to the image processing apparatus 20 via the data I/F circuit 170.

The moving-image codec circuit 130 generates display moving-image data by performing various types of moving-image decompression processes (decoding) for reproducing a moving image such as an MPEG decompression process and an H.264 decompression process on the recording image data input from the recording medium 4 via the media I/F circuit 150. Then, the moving-image codec circuit 130 outputs the generated display moving-image data to the display processing circuit 160 and causes the display device 5 to display the generated moving-image data. In addition, the moving-image codec circuit 130 can transmit the generated display moving-image data to the image processing apparatus 20 via the data I/F circuit 170.

The JPEG processing circuit 140 generates record still-image data by performing a JPEG compression process for recording a still image for image data of the still image input from the image processing circuit 121 or 122 and causes the recording medium 4 to record the generated record still-image data via the media I/F circuit 150. In addition, the JPEG processing circuit 140 can generate motion JPEG type moving-image data by collecting record still-image data of continuous frames by similarly performing the JPEG compression process on image data of each frame in a moving image input from the image processing circuit 121 or 122. Then, the JPEG processing circuit 140 causes the recording medium 4 to record the generated motion JPEG type moving-image data via the media I/F circuit 150. In addition, the JPEG processing circuit 140 can transmit the generated record still-image data or motion JPEG type moving-image data to the image processing apparatus 20 via the data I/F circuit 170.

The JPEG processing circuit 140 generates display still-image data by performing the JPEG decompression process for reproducing the still image on record still-image data input from the recording medium 4 via the media I/F circuit 150 and outputs the generated display still-image data to the display processing circuit 160, thereby causing the display device 5 to display the generated display still-image data. In addition, the JPEG processing circuit 140 can generate display moving-image data by similarly performing the JPEG decompression process on the record still-image data of continuous frames collected as the motion JPEG type moving-image data input from the recording medium 4 via the media I/F circuit 150. Then, the JPEG processing circuit 140 outputs the display moving-image data generated from the motion JPEG type moving-image data to the display processing circuit 160, thereby causing the display device 5 to display the display moving-image data. In addition, the JPEG processing circuit 140 can transmit the generated display still-image data or the display moving-image data generated from the motion JPEG type moving-image data to the image processing apparatus 20 via the data I/F circuit 170.

The media I/F circuit 150 causes the recording medium 4 to record the recording image data (moving-image data, still-image data, or motion JPEG type moving-image data) input from the moving-image codec circuit 130 or the JPEG processing circuit 140. In addition, the media I/F circuit 150 reads the recording image data recorded on the recording medium 4 and outputs the read recording image data to the moving-image codec circuit 130 and the JPEG processing circuit 140.

The media I/F circuit 150 can cause the recording medium 4 to record the recording image data (moving-image data, still-image data, or motion JPEG type moving-image data) transmitted from the image processing apparatus 20 via the data I/F circuit 170. In addition, the media I/F circuit 150 can transmit the recording image data read from the recording medium 4 to the image processing apparatus 20 via the data I/F circuit 170.

The display processing circuit 160 performs a display process such as a process of superimposing on-screen display (OSD) data on the display image data (moving-image data, still-image data, or motion JPEG type moving-image data) input from the moving-image codec circuit 130 or the JPEG processing circuit 140. Then, the display processing circuit 160 outputs the display image data after the display process is performed on the connected display device 5, thereby causing the display device 5 to display the display image data. In addition, the display processing circuit 160 similarly performs the display process on the image data input from the image processing circuit 122 and outputs the image data to the display device 5, thereby causing the display device 5 to display the image data.

The display processing circuit 160 can also similarly perform the display process on the display image data (moving-image data, still-image data, or motion JPEG type moving-image data) transmitted from the image processing apparatus 20 via the data I/F circuit 170 and output the display image data to the display device 5, thereby causing the display device 5 to display the display image data.

The data I/F circuit 170 is an I/F circuit for exchanging (transmitting/receiving) data with (to/from) the image processing apparatus 20 provided in the moving-image recording/reproduction apparatus 1. The data I/F circuit 170 transmits the recording image data (moving-image data, still-image data, or motion JPEG type moving-image data) generated by the moving-image codec circuit 130 or the JPEG processing circuit 140 to the image processing apparatus 20. In addition, the data I/F circuit 170 can transmit the recording image data read by the media I/F circuit 150 from the recording medium 4 to the image processing apparatus 20. In addition, the data I/F circuit 170 receives the recording image data (moving-image data, still-image data, or motion JPEG type moving-image data) transmitted from the image processing apparatus 20 and outputs the received recording image data to the media I/F circuit 150, thereby causing the recording medium 4 to record the received recording image data.

The data I/F circuit 170 transmits the display image data (moving-image data, still-image data, or motion JPEG type moving-image data) generated by the moving-image codec circuit 130 or the JPEG processing circuit 140 to the image processing apparatus 20. In addition, the data I/F circuit 170 receives the display image data (moving-image data, still-image data, or motion JPEG type moving-image data) transmitted from the image processing apparatus 20 and outputs the received display image data to the display processing circuit 160, thereby causing the display device 5 to display the received display image data.

The control circuit 100, for example, is a control circuit such as a central processing unit (CPU) for controlling each component within the image processing apparatus 10. The control circuit 100 controls an operation of each component within the image processing apparatus 10 based on information of an operation mode of an imaging system input from the user I/F circuit 3.

In the moving-image recording/reproduction device 1, as described above, the image processing apparatuses 10 and 20 cooperatively operate in parallel, thereby implementing a moving-image function in the moving-image recording/reproduction apparatus 1. Thus, the control circuit 100 exchanges (transmits/receives) information necessary to implement a moving-image function such as information of an operation mode of the imaging system or information of a process to be executed by the image processing apparatus 20 input from the user I/F circuit 3 with (to/from) the image processing apparatus 20. Also, in the configuration of the moving-image recording/reproduction apparatus 1 showed in FIG. 1, the control circuit 100 provided in the image processing apparatus 10 operates as a master/slave type master processor.

The image processing apparatus 20 includes a control circuit 200, an image reduction circuit 210, an image processing circuit 221, an image processing circuit 222, a moving-image codec circuit 230, an JPEG processing circuit 240, a media I/F circuit 250, a display processing circuit 260, and a data I/F circuit 270. Similar to the image processing apparatus 10, the image processing apparatus 20 performs predetermined image processing on a moving image input from an input circuit (the imaging circuit 2 or the recording medium 4) for inputting a moving image to the moving-image recording/reproduction apparatus 1.

Similar to the image reduction circuit 110 provided in the image processing apparatus 10, the image reduction circuit 210 generates an image signal of each frame of a moving image having a smaller number of pixels at the same angle of view as the moving image input from the imaging circuit 2 based on the image signal of each frame in the high-resolution moving image input from the imaging circuit 2, and outputs the generated image signal as the image signal of each frame in the low-resolution moving image to the image processing circuit 222. Also, similar to the image reduction circuit 110, the image reduction circuit 210 outputs the image signal obtained by performing the resizing process to the image processing circuit 222 even when the high-resolution still image has been input from the imaging circuit 2.

Similar to the image processing circuit 121 provided in the image processing apparatus 10, the image processing circuit 221 generates image data of each frame of the high-resolution moving image by performing image processing on the image signal of each frame in the high-resolution moving image input from the imaging circuit 2, and outputs the generated image data to the moving-image codec circuit 230 and the JPEG processing circuit 240. Also, similar to the image processing circuit 121, the image processing circuit 221 outputs image data obtained by performing the image processing to the moving-image codec circuit 230 and the JPEG processing circuit 240 even when the high-resolution still image has been input from the imaging circuit 2.

Similar to the image processing circuit 122 provided in the image processing apparatus 10, the image processing circuit 222 generates image data of each frame of the low-resolution moving image by performing image processing as in the image processing circuit 221 on the image signal of each frame in the low-resolution moving image input from the image reduction circuit 210, and outputs the generated image data to the moving-image codec circuit 230 and the JPEG processing circuit 240. Also, similar to the image processing circuit 221, the image processing circuit 222 outputs the image data obtained by performing image processing to the moving-image codec circuit 230 and the JPEG processing circuit 240 even when an image signal obtained by performing the resizing process on the high-resolution still image has been input from the image reduction circuit 210.

Similar to the moving-image codec circuit 130 provided in the image processing apparatus 10, the moving-image codec circuit 230 generates moving-image data used for recording by performing a moving-image compression process (encoding) on image data of each frame in the moving image input from the image processing circuit 221 or 222 and causes the recording medium 4 to record the generated moving-image data via the media IT circuit 250. In addition, similar to the moving-image codec circuit 130, the moving-image codec circuit 230 can transmit the generated moving-image data to the image processing apparatus 10 via the data IT circuit 270.

Similar to the moving-image codec circuit 130, the moving-image codec circuit 230 generates moving-image data used for displaying by performing a moving-image decompression process (decoding) on the moving-image data used for recording and input from the recording medium 4 via the media I/F circuit 250 and outputs the generated display moving-image data to the display processing circuit 260, thereby causing the display device 5 to display the generated display moving-image data. In addition, similar to the moving-image codec circuit 130, the moving-image codec circuit 230 can transmit the generated display moving-image data to the image processing apparatus 10 via the data I/F circuit 270.

Similar to the JPEG processing circuit 140 provided in the image processing apparatus 10, the JPEG processing circuit 240 generates record still-image data by performing a JPEG compression process on image data of a still image input from the image processing circuit 221 or 222 and causes the recording medium 4 to record the generated record still-image data via the media I/F circuit 250. In addition, similar to the JPEG processing circuit 140, the JPEG processing circuit 240 generates motion JPEG type moving-image data by similarly performing a JPEG compression process on image data of each frame in the moving image input from the image processing circuit 221 or 222 and causes the recording medium 4 to record the generated motion JPEG type moving-image data via the media I/F circuit 250. In addition, similar to the JPEG processing circuit 140, the JPEG processing circuit 240 can transmit the generated record still-image data or motion JPEG type moving-image data to the image processing apparatus 10 via the data I/F circuit 270

Similar to the JPEG processing circuit 140, the JPEG processing circuit 240 generates the display still-image data by performing a JPEG decompression process on the record still-image data input from the recording medium 4 via the media I/F circuit 250 and outputs the generated display still image data to the display processing circuit 260, thereby causing the display device 5 to display the generated display still-image data. In addition, similar to the JPEG processing circuit 140, the JPEG processing circuit 240 generates display moving-image data by similarly performing the JPEG decompression process on the motion JPEG type moving-image data input from the recording medium 4 via the media I/F circuit 250 and outputs the generated display moving-image data to the display processing circuit 260, thereby causing the display device 5 to display the generated display moving-image data. In addition, similar to the JPEG processing circuit 140, the JPEG processing circuit 240 can transmit the generated display still-image data or the display moving-image data generated from the motion JPEG type moving-image data to the image processing apparatus 10 via the data I/F circuit 270.

Similar to the media I/F circuit 150 provided in the image processing apparatus 10, the media I/F circuit 250 causes the recording medium 4 to record the recording image data (moving-image data, still-image data, or motion JPEG type moving-image data) input from the moving-image codec circuit 230 or the JPEG processing circuit 240. In addition, similar to the media I/F circuit 150, the media I/F circuit 250 reads the recording image data recorded on the recording medium 4 and outputs the read recording image data to the moving-image codec circuit 230 and the JPEG processing circuit 240.

Similar to the media I/F circuit 150, the media I/F circuit 250 can cause the recording medium 4 to record the recording image data (moving-image data, still-image data, or motion JPEG type moving-image data) transmitted from the image processing apparatus 10 via the data I/F circuit 270. In addition, similar to the media I/F circuit 150, the media I/F circuit 250 can transmit the recording image data read from the recording medium 4 to the image processing apparatus 10 via the data I/F circuit 270.

Similar to the display processing circuit 160 provided in the image processing apparatus 10, the display processing circuit 260 performs a display process on the display image data (moving-image data, still-image data, or motion JPEG type moving-image data) input from the moving-image codec circuit 230 or the JPEG processing circuit 240 and outputs the display image data to the connected display device 5, thereby causing the connected display device 5 to display the display image data. In addition, similar to the display processing circuit 160, the display processing circuit 260 also performs a similar display process on the image data input from the image processing circuit 222 and outputs the image data to the display device 5, thereby causing the display device 5 to display the image data.

Similar to the display processing circuit 160, the display processing circuit 260 can also similarly perform the display process on the display image data (moving-image data, still-image data, or motion JPEG type moving-image data) transmitted from the image processing apparatus 10 via the data I/F circuit 270 and output the display image data to the display device 5, thereby causing the display device 5 to display the display image data.

Similar to the data I/F circuit 170 provided in the image processing apparatus 10, the data I/F circuit 270 is an I/F circuit for exchanging (transmitting/receiving) data with (to/from) the image processing apparatus 10 provided in the moving-image recording/reproduction apparatus 1. Similar to the data I/F circuit 170, the data I/F circuit 270 transmits the recording image data (moving-image data, still-image data, or motion JPEG type moving-image data) generated by the moving-image codec circuit 230 or the JPEG processing circuit 240 to the image processing apparatus 10. In addition, similar to the data I/F circuit 170, the data I/F circuit 270 can transmit the recording image data read by the media I/F circuit 250 from the recording medium 4 to the image processing apparatus 10. In addition, similar to the data I/F circuit 170, the data I/F circuit 270 receives the recording image data (moving-image data, still-image data, or motion JPEG type moving-image data) transmitted from the image processing apparatus 10 and outputs the received recording image data to the media I/F circuit 250, thereby causing the recording medium 4 to record the received recording image data.

Similar to the data I/F circuit 170, the data I/F circuit 270 transmits the display image data (moving-image data, still-image data, or motion JPEG type moving-image data) generated by the moving-image codec circuit 230 or the JPEG processing circuit 240 to the image processing apparatus 10. In addition, similar to the data I/F circuit 170, the data I/F circuit 270 receives the display image data (moving-image data, still-image data, or motion JPEG type moving-image data) transmitted from the image processing apparatus 10 and outputs the received display image data to the display processing circuit 260, thereby causing the display device 5 to display the received display image data.

Similar to the control circuit 100 provided in the image processing apparatus 10, the control circuit 200 is a control circuit which controls each component within the image processing apparatus 20. The control circuit 200 controls an operation of each component within the image processing apparatus 20 based on information (information of an operation mode of the imaging system, information of a process to be executed by the image processing apparatus 20, or the like) necessary to implement the moving-image function transmitted from the control circuit 100 provided in the image processing apparatus 10. In addition, the control circuit 200 transmits information of an operation according to information necessary to implement the moving-image function transmitted from the control circuit 100, to the image processing apparatus 10. Also, in the configuration of the moving-image recording/reproduction apparatus 1 showed in FIG. 1, the control circuit 200 provided in the image processing apparatus 20 operates as a master/slave type slave processor.

Through this configuration, the image processing apparatuses 10 and 20 having similar configurations cooperatively operate in parallel in the moving-image recording/reproduction apparatus 1, so that a low-resolution moving image is recorded on the recording medium 4 at the same angle of view simultaneously when a high-resolution moving image captured by the imaging circuit 2 is recorded on the recording medium 4. Thereby, when the display device 5 for displaying the low-resolution image is connected in the moving-image recording/reproduction apparatus 1, it is possible to display the low-resolution moving image corresponding to the high-resolution moving image recorded on the connected display device 5 without performing conversion from the recorded high-resolution moving image to the low-resolution moving image.

Next, an operation of the moving-image recording/reproduction apparatus 1 of this embodiment will be described. Also, in the following description, a case in which the imaging circuit 2 outputs an image signal having the 4K2K (3840×2160) resolution as an example of a resolution of a moving image recorded by the moving-image recording/reproduction apparatus 1 as an image signal of each frame in the high-resolution moving image and the display device 5 is a display device corresponding to the low-resolution image for displaying an image having the VGA (640×480) resolution will be described. In addition, a case in which each of the moving-image codec circuit 130 provided in the image processing apparatus 10 and the moving-image codec circuit 230 provided in the image processing apparatus 20 is a moving-image codec corresponding to a moving image having the full HD (1920×1080) resolution smaller than the 4K2K resolution will be described.

Then, a case in which a region of the moving image having the 4K2K resolution of one frame input from the imaging circuit 2 is divided into two regions in a horizontal direction, that is, divided into left and right regions, the image processing apparatus 10 performs image processing on a moving image of the left-half region, and the image processing apparatus 20 performs image processing on a moving image of the right-half region will be described. In addition, the image processing apparatus 10, which generates a moving image having a low VGA resolution at the same angle of view as a moving image having the 4K2K resolution of one frame input from the imaging circuit 2, will be described.

<First Recording Operation>

First, the first recording operation in which the moving-image recording/reproduction apparatus 1 records a high-resolution moving image and a low-resolution moving image will be described. In the first recording operation in which the moving-image recording/reproduction apparatus 1 records a moving image, each of the moving-image codec circuit 130 provided in the image processing apparatus 10 and the moving-image codec circuit 230 provided in the image processing apparatus 20 generates moving-image data used for recording of a corresponding region in a high-resolution moving image and causes the recording medium 4 to record the generated moving-image data. Further, in the first recording operation, the JPEG processing circuit 140 provided in the image processing apparatus 10 generates motion JPEG type moving-image data used for recording and causes the recording medium 4 to record the generated motion JPEG type moving-image data. Also, a case in which an MPEG compression process is performed as a moving-image compression process (encoding) to be performed by each of the moving-image codec circuit 130 and the moving-image codec circuit 230 in this first recording operation will be described.

Figure 2:
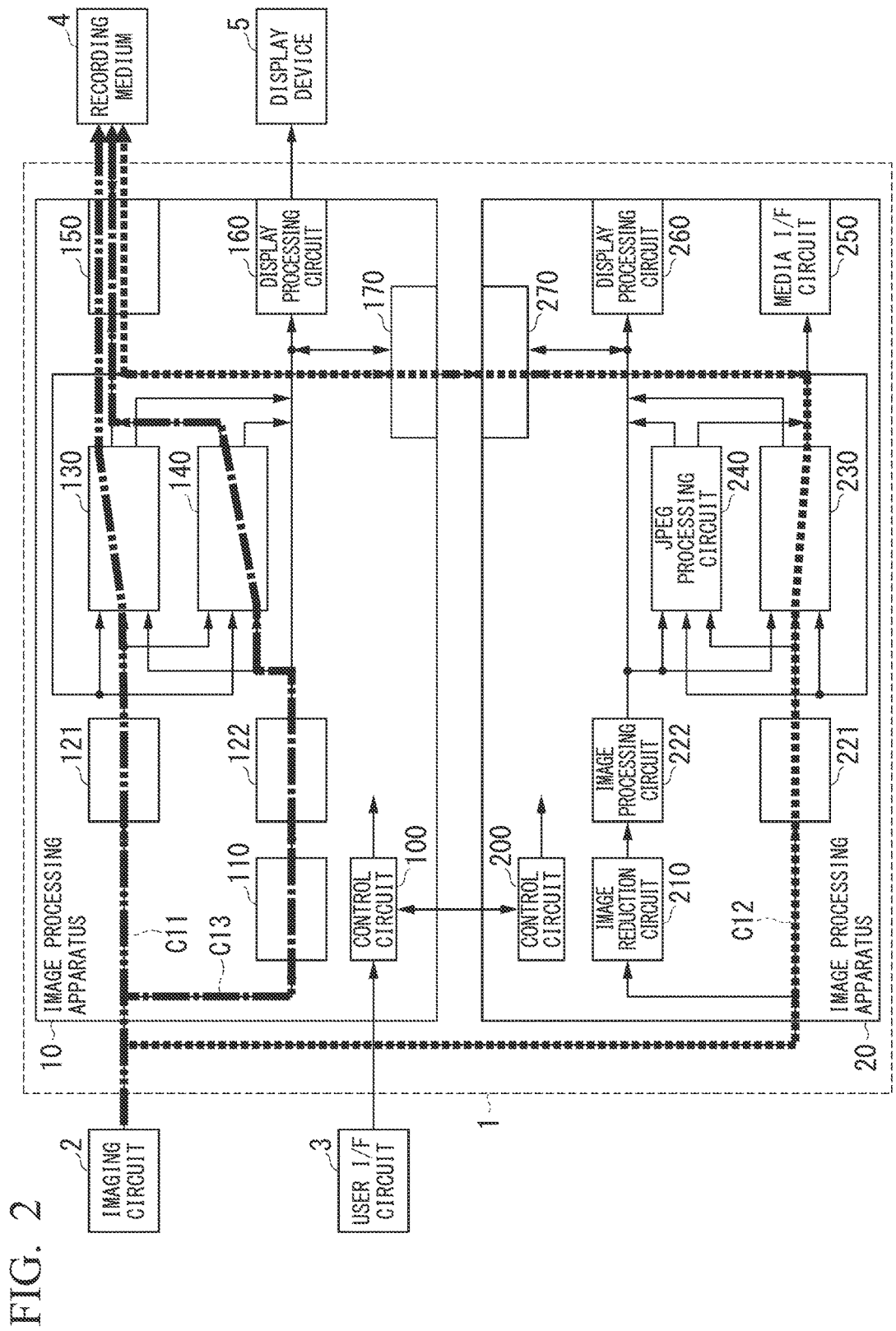
FIG. 2 is a diagram schematically showing an example of a first recording operation of recording a moving image in the moving-image recording/reproduction apparatus of this embodiment.

FIG. 2 is a diagram schematically showing an example of the first recording operation of recording a moving image in the moving-image recording/reproduction apparatus 1 of this embodiment. In FIG. 2, each moving-image data path in this first recording operation is showed on the block diagram of the moving-image recording/reproduction apparatus 1 showed in FIG. 1. Also, although the recording medium 4 sequentially records moving-image data used for recording of each frame generated based on an image signal of each frame of the high-resolution moving image input from the imaging circuit 2 in this first recording operation, processing on the moving image of one frame input from the imaging circuit 2 will be described for ease of description in the following description.

The first recording operation starts when the user of the imaging system equipped with the moving-image recording/reproduction apparatus 1 operates the user I/F circuit 3 to set the operation mode of the imaging system to an operation mode (moving-image recording mode) in which the moving image captured by the imaging circuit 2 is recorded on the recording medium 4.

When the operation mode of the imaging system is set to the moving-image recording mode, the user I/F circuit 3 outputs information indicating that the moving-image recording mode has been set through the user's operation to the control circuit 100 provided in the image processing apparatus 10 within the moving-image recording/reproduction apparatus 1. Thereby, the control circuit 100 transmits information indicating that the image processing apparatus 20 executes image processing on a right-half region of a high-resolution moving image input from the imaging circuit 2 to the image processing apparatus 20. Then, the control circuit 100 controls an operation of each component provided in the image processing apparatus 10 so as to execute image processing on a left-half region of the high-resolution moving image input from the imaging circuit 2.

In the first recording operation in the image processing apparatus 10, the recording medium 4 records moving-image data used for recording (hereinafter referred to as "left MPEG moving-image data") generated based on the image signal of the left-half region of the high-resolution moving image input from the imaging circuit 2 through the path of the moving-image data in a path C11 showed in FIG. 2. For example, in the first recording operation in the image processing apparatus 10, the recording medium 4 records left MPEG moving-image data generated based on the image signal of the left-half region of a moving image having the 4K2K resolution input from the imaging circuit 2 through the path of the moving-image data in the path C11.

More specifically, first, the image processing circuit 121 outputs image data generated by performing various types of image processing such as noise cancellation and a YC conversion process on the image signal of the left-half region of the high-resolution moving image input from the imaging circuit 2 to the moving-image codec circuit 130. Subsequently, the moving-image codec circuit 130 generates the left MPEG moving-image data by performing an MPEG compression process (encoding) on the image data of the left-half region of the high-resolution moving image input from the image processing circuit 121 and outputs the generated left MPEG moving-image data to the media I/F circuit 150.

For example, first, the image processing circuit 121 outputs image data generated by performing image processing on the image signal of the left-half region of the moving image having the 4K2K resolution input from the imaging circuit 2 to the moving-image codec circuit 130. Subsequently, the moving-image codec circuit 130 outputs the left MPEG moving-image data generated by performing an MPEG compression process on the image data of the left-half region of the moving image having the 4K2K resolution input from the image processing circuit 121 to the media I/F circuit 150.

On the other hand, the control circuit 200 controls an operation of each component provided in the image processing apparatus 20 so as to execute image processing on the right-half region of the high-resolution moving image input from the imaging circuit 2 according to information indicating the image processing to be executed transmitted from the control circuit 100 provided in the image processing apparatus 10.

In the first recording operation in the image processing apparatus 20, the recording medium 4 records moving-image data used for recording (hereinafter referred to as "right MPEG moving-image data") generated based on the image signal of the right-half region of the high-resolution moving image input from the imaging circuit 2 through the path of the moving-image data in a path C12 showed in FIG. 2. For example, in the first recording operation in the image processing apparatus 20, the recording medium 4 records right MPEG moving-image data generated based on the image signal of the right-half region of the moving image having the 4K2K resolution input from the imaging circuit 2 through the path of the moving-image data in the path C12.

More specifically, first, the image processing circuit 221 outputs image data generated by performing various types of image processing such as noise cancellation and a YC conversion process on the image signal of the right-half region of the high-resolution moving image input from the imaging circuit 2 to the moving-image codec circuit 230 similar to the image processing circuit 121 provided in the image processing apparatus 10. Subsequently, similar to the moving-image codec circuit 130 provided in the image processing apparatus 10, the moving-image codec circuit 230 generates right MPEG moving-image data by performing an MPEG compression process (encoding) on the image data of the right-half region of the high-resolution moving image input from the image processing circuit 221 and outputs the generated right MPEG moving-image data to the data I/F circuit 270. Thereby, the data I/F circuit 270 transmits the right MPEG moving-image data input from the moving-image codec circuit 230 to the image processing apparatus 10. Then, the data I/F circuit 170 receives the right MPEG moving-image data transmitted from the data I/F circuit 270 provided in the image processing apparatus 20 and outputs the received right MPEG moving-image data to the media I/F circuit 150.

For example, first, the image processing circuit 221 outputs image data generated by performing image processing on the image signal of the right-half region of the moving image having the 4K2K resolution input from the imaging circuit 2 to the moving-image codec circuit 230. The moving-image codec circuit 230 outputs right MPEG moving-image data generated by performing an MPEG compression process on the image data of the right-half region of the moving image having the 4K2K resolution input from the image processing circuit 221 to the data I/F circuit 270. Then, the data I/F circuit 270 transmits the right MPEG moving-image data input from the moving-image codec circuit 230 to the image processing apparatus 10 and the data I/F circuit 170 outputs the received right MPEG moving-image data to the media I/F circuit 150.

In the first recording operation in the image processing apparatus 10, the recording medium 4 records low-resolution motion JPEG type recording moving-image data (hereinafter referred to as "motion JPEG moving-image data") having the same angle of view as the high-resolution moving image input from the imaging circuit 2 through the path of moving-image data in a path C13 showed in FIG. 2 simultaneously with a recording operation of recording the left MPEG moving-image data and the right MPEG moving-image data on the recording medium 4. For example, in the first recording operation in the image processing apparatus 10, the recording medium 4 records the motion JPEG moving-image data having the VGA resolution at the same angle of view as the moving image having the 4K2K resolution input from the imaging circuit 2 though the path of the moving-image data in the path C13.

More specifically, first, the image reduction circuit 110 outputs an image signal of a low-resolution moving image having a smaller number of pixels at the same angle of view as a high-resolution moving image generated by performing a resizing process, for example, such as a thinning process, on an image signal of the high-resolution moving image input from the imaging circuit 2 to the image processing circuit 122. Thereby, similar to the image processing circuit 121, the image processing circuit 122 outputs image data of the low-resolution moving image generated by performing various types of image processing such as noise cancellation and YC conversion processing on the image signal of the low-resolution moving image input from the image reduction circuit 110 to the JPEG processing circuit 140. Subsequently, the JPEG processing circuit 140 generates motion JPEG moving-image data by performing the JPEG compression process on the image data of the low-resolution moving image input from the image processing circuit 122 and outputs the generated motion JPEG moving-image data to the media I/F circuit 150.

For example, first, the image reduction circuit 110 outputs an image signal of a moving image having the VGA resolution generated by performing a resizing process on the image signal of the moving image having the 4K2K resolution input from the imaging circuit 2 to the image processing circuit 122, and the image processing circuit 122 outputs image data of the moving image having the VGA resolution generated by performing image processing on the image signal of the moving image having the VGA resolution input from the image reduction circuit 110 to the JPEG processing circuit 140. Then, the JPEG processing circuit 140 outputs motion JPEG moving-image data generated by performing the JPEG compression process on the image data of the moving image having the VGA resolution input from the image processing circuit 122 to the media I/F circuit 150.

Thereby, in the first recording operation, the media I/F circuit 150 combines the left MPEG moving-image data input from the moving-image codec circuit 130 with the right MPEG moving-image data input from the data I/F circuit 170 and causes the recording medium 4 to record a combination result as moving-image data used for recording (hereinafter referred to as "MPEG moving-image data") in the high-resolution moving image input from the imaging circuit 2. In addition, the media I/F circuit 150 causes the recording medium 4 to record the motion JPEG moving-image data input from the JPEG processing circuit 140 as the low-resolution moving-image data used for recording that corresponds to the high-resolution moving image input from the imaging circuit 2. For example, the media I/F circuit 150 causes the recording medium 4 to record MPEG moving-image data having the 4K2K resolution obtained by combining the left MPEG moving-image data input from the moving-image codec circuit 130 with the right MPEG moving-image data input from the data I/F circuit 170, and causes the recording medium 4 to record the motion JPEG moving-image data having the VGA resolution input from the JPEG processing circuit 140. At this time, the media I/F circuit 150 associates the MPEG moving-image data with the motion JPEG moving-image data and the associated data is recorded on the recording medium 4.

In this manner, in the first recording operation, the two image processing apparatuses 10 and 20 having moving-image codecs corresponding to the moving image having a lower resolution than the high-resolution moving image provided in the moving-image recording/reproduction apparatus 1 cooperatively perform image processing in parallel so as to record the moving-image data used for recording in the high-resolution moving image on the recording medium 4. In addition, in the first recording operation, the image processing apparatus 10 performs image processing on the low-resolution moving image having the same angle of view as the high-resolution moving image input from the imaging circuit 2 in parallel with image processing on the high-resolution moving image to record the moving-image data used for recording in the low-resolution moving image having the same angle of view as the high-resolution moving image on the recording medium 4. For example, the two image processing apparatuses 10 and 20 having moving-image codecs corresponding to a moving image having the full HD (1920×1080) resolution cooperatively perform image processing on the left-half region of the high-resolution moving image input from the imaging circuit 2 and image processing on the right-half region in parallel so as to record moving-image data having the 4K2K (3840×2160) resolution on the recording medium 4. In addition, the image processing apparatus 10 records moving-image data having the VGA resolution at the same angle of view as the moving image having the 4K2K resolution on the recording medium 4 by performing image processing on the moving image having the VGA resolution at the same angle of view as the moving image having the 4K2K resolution input from the imaging circuit 2 in parallel.

Thereby, when the display device 5 for displaying the image having the VGA resolution is connected in the moving-image recording/reproduction apparatus 1, it is possible to cause the connected display device 5 to display the moving image having the VGA resolution corresponding to the recorded moving image having the 4K2K resolution without performing conversion from the recorded moving image having the 4K2K resolution into the moving image having the VGA resolution.

<First Reproduction Operation>

Next, the first reproduction operation in which the moving-image recording/reproduction apparatus 1 reproduces a low-resolution moving image will be described. In the first reproduction operation in which the moving-image recording/reproduction apparatus 1 reproduces the low-resolution moving image, the JPEG processing circuit 140 provided in the image processing apparatus 10 generates display moving-image data according to motion JPEG type moving-image data used for recording that is recorded on the recording medium 4 and causes the display device 5 to display the display moving-image data.

Figure 3:
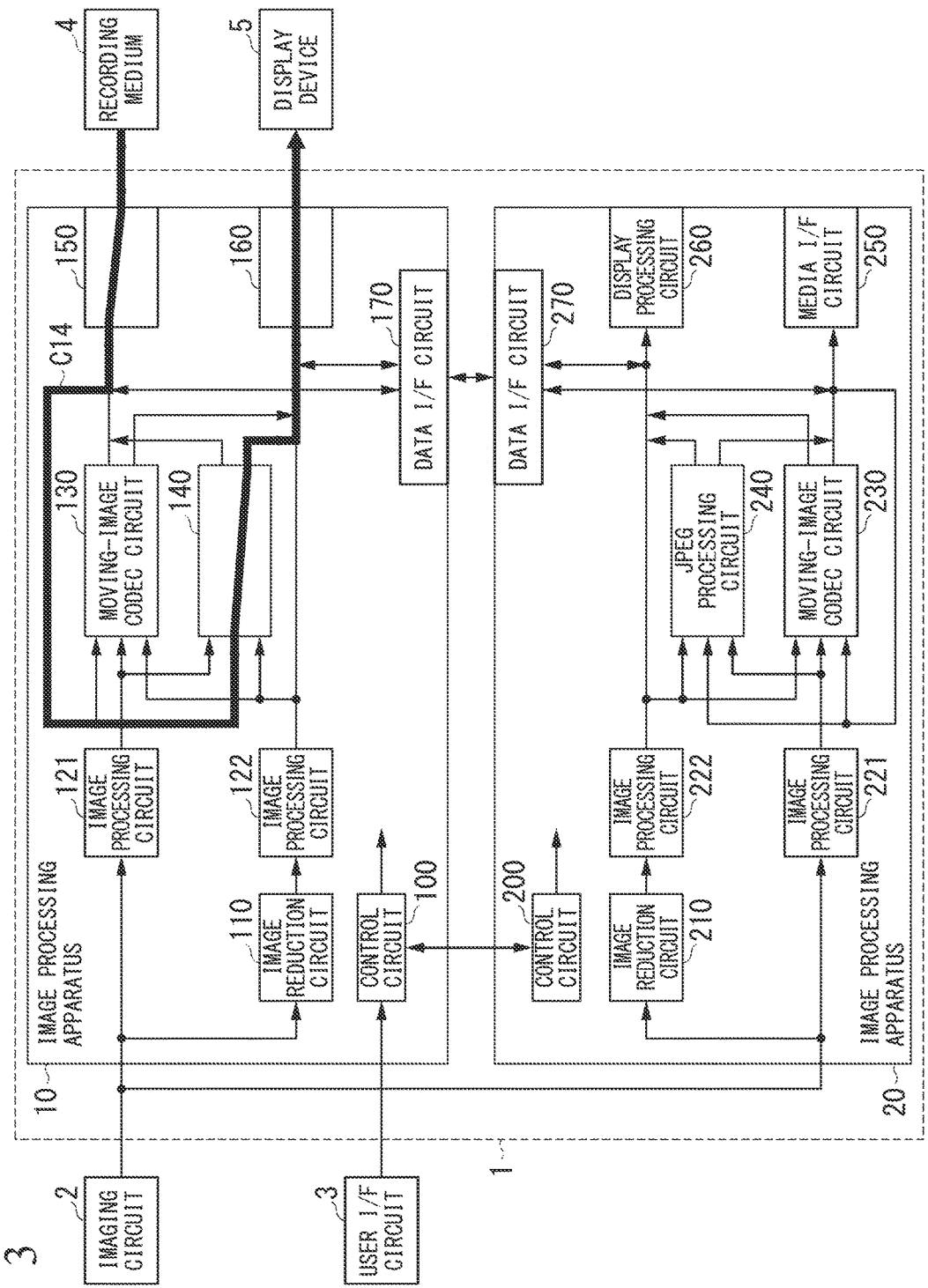
FIG. 3 is a diagram schematically showing an example of a first reproduction operation of reproducing the moving image in the moving-image recording/reproduction apparatus of this embodiment.

FIG. 3 is a diagram schematically showing an example of the first reproduction operation of reproducing the moving image in the moving-image recording/reproduction apparatus 1 of this embodiment. In FIG. 3, each moving-image data path in this first reproduction operation is showed on the block diagram of the moving-image recording/reproduction apparatus 1 showed in FIG. 1. Also, although the display device 5 sequentially displays display moving-image data generated based on record still-image data of continuous frames collected as the motion JPEG moving-image data recorded on the recording medium 4 in this first reproduction operation, processing on the motion JPEG moving-image data of one frame input from the recording medium 4 will be described for ease of description in the following description.

The first reproduction operation starts when the user of the imaging system equipped with the moving-image recording/reproduction apparatus 1 operates the user I/F circuit 3 to set the operation mode of the imaging system to an operation mode (moving-image reproduction mode) in which the display device 5 displays the moving image recorded on the recording medium 4.

When the operation mode of the imaging system is set to the moving-image reproduction mode, the user I/F circuit 3 outputs information indicating that the moving-image reproduction mode has been set through the user's operation to the control circuit 100 provided in the image processing apparatus 10 within the moving-image recording/reproduction apparatus 1. Thereby, the control circuit 100 reads the motion JPEG moving-image data from the recording medium 4 and controls an operation of each component provided in the image processing apparatus 10 so as to execute image processing on the read motion JPEG moving-image data. Also, because the display device 5 connected to the moving-image recording/reproduction apparatus 1 is a display device corresponding to a low-resolution image for displaying an image of the VGA resolution, the control circuit 100 does not transmit information related to the moving-image reproduction mode to the image processing apparatus 20.

In the first reproduction operation in the image processing apparatus 10, the display device 5 displays display moving-image data generated based on the motion JPEG moving-image data read from the recording medium 4 through the path of the moving-image data in a path C14 showed in FIG. 3. For example, in the first reproduction operation in the image processing apparatus 10, the display device 5 displays the display moving-image data having the VGA resolution generated based on the motion JPEG moving-image data having the VGA resolution read from the recording medium 4 through the path of the moving-image data in the path C14.

More specifically, first, the media I/F circuit 150 reads the motion JPEG moving-image data recorded on the recording medium 4 and outputs the read motion JPEG moving-image data to the JPEG processing circuit 140. Subsequently, the JPEG processing circuit 140 generates display moving-image data by performing a JPEG decompression process on the motion JPEG moving-image data input from the media I/F circuit 150 and outputs the generated display moving-image data to the display processing circuit 160. Thereby, the display processing circuit 160 performs a display process on the display moving-image data input from the JPEG processing circuit 140 and outputs the display image data after the processing by the display processing circuit to the connected display device 5, thereby causing the connected display device 5 to display the display image data.

For example, first, the media I/F circuit 150 reads the motion JPEG moving-image data having the VGA resolution recorded on the recording medium 4 and outputs the read JPEG moving-image data to the JPEG processing circuit 140. Subsequently, the JPEG processing circuit 140 outputs the display moving-image data having the VGA resolution generated by performing the JPEG decompression process on the motion JPEG moving-image data having the VGA resolution input from the media I/F circuit 150 to the display processing circuit 160. Thereby, the display processing circuit 160 outputs the display image data after the display process is performed on the display moving-image data having the VGA resolution input from the JPEG processing circuit 140 to the display device 5, thereby causing the display device 5 to display the display image data.

In this manner, in the first reproduction operation, one image processing apparatus 10 provided in the moving-image recording/reproduction apparatus 1 performs image processing to cause the display device 5 corresponding to the low-resolution image to display moving-image data used for displaying according to the low-resolution moving image having a smaller number of pixels at the same angle of view as the high-resolution moving image. For example, the image processing apparatus 10 reads the moving-image data having the VGA resolution recorded on the recording medium 4 in association with the moving-image data having the 4K2K (3840×2160) resolution to perform the image processing on the moving-image data and therefore only the image processing apparatus 10 causes the display device 5 to display the moving image having the VGA resolution.

In this manner, when the display device 5 for displaying the image having the VGA resolution is connected in the moving-image recording/reproduction apparatus 1, it is possible to cause the connected display device 5 to display the moving image having the VGA resolution without performing conversion into the display moving-image data in the moving image having the VGA resolution corresponding to the recorded moving-image data having the 4K2K resolution.

The case in which only the image processing apparatus 10 reads the motion JPEG moving-image data having the VGA resolution recorded on the recording medium 4 and causes the display device 5 to display the display moving-image data because the display device 5 corresponding to the low-resolution image for displaying the image having the VGA resolution is connected to the moving-image recording/reproduction apparatus 1 in the first reproduction operation has been shown. However, if the display device corresponding to the high-resolution image for displaying the image having the 4K2K resolution is connected to the moving-image recording/reproduction apparatus 1, the image processing apparatuses 10 and 20 cooperatively operate in parallel so as to cause the display moving-image data according to the MPEG moving-image data recorded on the recording medium 4 to be displayed.

Here, the first reproduction operation in which the moving-image recording/reproduction apparatus 1 reproduces the high-resolution moving image will be described. In the first reproduction operation (hereinafter referred to as a "$1A^{th}$ reproduction operation") in which the moving-image recording/reproduction apparatus 1 reproduces the high-resolution moving image, the display device 5 connected to the moving-image recording/reproduction apparatus 1 will be described as the display device corresponding to the high-resolution image for displaying an image having the 4K2K (3840×2160) resolution. Then, a case in which a region of the moving image having the 4K2K resolution of one frame of MPEG moving-image data recorded on the recording medium 4 is divided into two regions in a horizontal direction, that is, divided into left and right regions, the image processing apparatus 10 generates display moving-image data for a moving image of the left-half region, and the image processing apparatus 20 generates display moving-image data for a moving image of the right-half region will be described.

Figure 4:
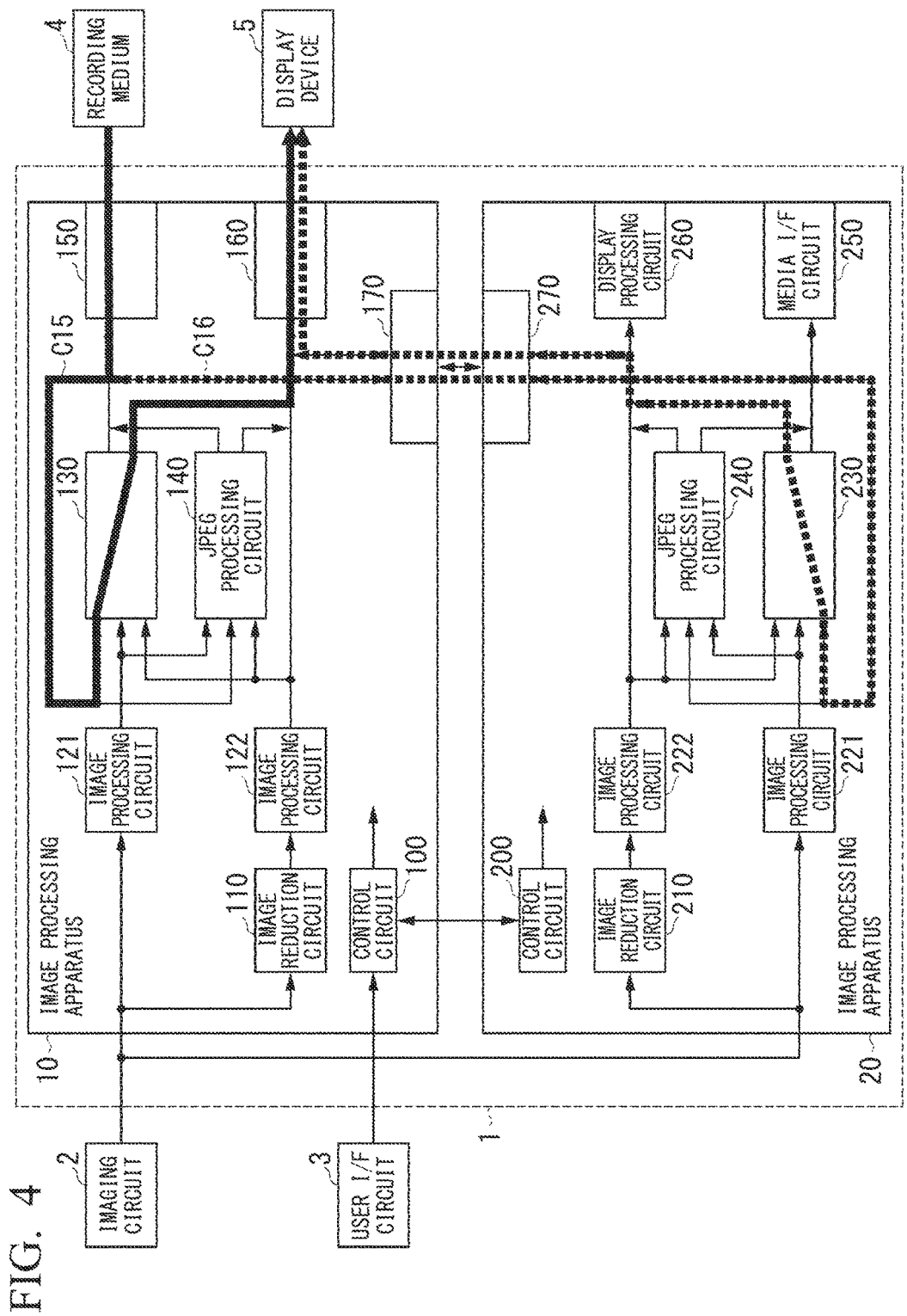
FIG. 4 is a diagram schematically showing another example of the first reproduction operation of reproducing the moving image in the moving-image recording/reproduction apparatus of this embodiment.

FIG. 4 is a diagram schematically showing another example of the first reproduction operation of reproducing the moving image in the moving-image recording/reproduction apparatus of this embodiment. In FIG. 4, each moving-image data path in this $1A^{th}$ reproduction operation is showed on the block diagram of the moving-image recording/reproduction apparatus 1 showed in FIG. 1. Also, although the display device 5 sequentially displays display moving-image data generated based on moving-image data used for recording of each frame of MPEG moving-image data recorded on the recording medium 4 in this $1A^{th}$ reproduction operation, processing on the MPEG moving-image data of one frame input from the recording medium 4 will be described for ease of description in the following description.

The $1A^{th}$ reproduction operation starts when the user of the imaging system equipped with the moving-image recording/reproduction apparatus 1 operates the user I/F circuit 3 to set the operation mode of the imaging system to a moving-image reproduction mode.

When the operation mode of the imaging system is set to the moving-image reproduction mode, the user I/F circuit 3 outputs information indicating that the moving-image reproduction mode has been set through the user's operation to the control circuit 100 provided in the image processing apparatus 10 within the moving-image recording/reproduction apparatus 1. Thereby, the control circuit 100 transmits information indicating that the image processing apparatus 20 executes image processing on a right-half region of the MPEG moving-image data read from the recording medium 4 to the image processing apparatus 20. Then, the control circuit 100 controls an operation of each component provided in the image processing apparatus 10 so as to execute image processing on a left-half region of the MPEG moving-image data read from the recording medium 4.

In the $1A^{th}$ reproduction operation in the image processing apparatus 10, the display device 5 displays display moving-image data (hereinafter referred to "left display moving-image data") generated based on left-half moving-image data of the MPEG moving-image data read from the recording medium 4 through the path of the moving-image data in a path C15 showed in FIG. 4. For example, in the $1A^{th}$ reproduction operation in the image processing apparatus 10, the display device 5 displays left display moving-image data generated based on the left-half moving-image data of the MPEG moving-image data having the 4K2K resolution read from the recording medium 4 through the path of the moving-image data in the path C15.

More specifically, first, the media I/F circuit 150 reads the MPEG moving-image data recorded on the recording medium 4 and outputs the left-half moving-image data of the read MPEG moving-image data to the moving-image codec circuit 130. Subsequently, the moving-image codec circuit 130 generates the left display moving-image data by performing an MPEG decompression process (decoding) on the left-half moving-image data of the MPEG moving-image data input from the media I/F circuit 150, and outputs the generated left display moving-image data to the display processing circuit 160.

For example, first, the media I/F circuit 150 reads the MPEG moving-image data having the 4K2K resolution recorded on the recording medium 4 to output the left-half moving-image data to the moving-image codec circuit 130, and the moving-image codec circuit 130 outputs left display moving-image data generated by performing the MPEG decompression process on the left-half moving-image data of the MPEG moving-image data input from the media I/F circuit 150 to the display processing circuit 160.

On the other hand, the control circuit 200 provided in the image processing apparatus 20 controls an operation of each component provided in the image processing apparatus 20 so as to execute image processing on the right-half region of the MPEG moving-image data read from the recording medium 4 according to information indicating that the image processing is executed transmitted from the control circuit 100 provided in the image processing apparatus 10.

In the $1A^{th}$ reproduction operation in the image processing apparatus 20, the display device 5 displays display moving-image data (hereinafter referred to "right display moving-image data") generated based on right-half moving-image data of the MPEG moving-image data read from the recording medium 4 through the path of the moving-image data in a path C16 showed in FIG. 4. For example, in the $1A^{th}$ reproduction operation in the image processing apparatus 20, the display device 5 displays right display moving-image data generated based on the right-half moving-image data of the MPEG moving-image data having the 4K2K resolution read from the recording medium 4 through the path of the moving-image data in the path C16.

More specifically, first, the media I/F circuit 150 outputs the right-half moving-image data of the MPEG moving-image data read from the recording medium 4 to the data I/F circuit 170. Thereby, the data I/F circuit 170 transmits the right-half moving-image data of the MPEG moving-image data input from the media I/F circuit 150 to the image processing apparatus 20. Then, the data I/F circuit 270 receives the right-half moving-image data of the MPEG moving-image data transmitted from the data I/F circuit 170 provided in the image processing apparatus 10, and outputs the received right-half moving-image data to the moving-image codec circuit 230. Subsequently, similar to the moving-image codec circuit 130 provided in the image processing apparatus 10, the moving-image codec circuit 230 generates right display moving-image data by performing an MPEG decompression process (decoding) on the right-half moving-image data of the MPEG moving-image data input from the data I/F circuit 270 and outputs the generated right display moving-image data to the data I/F circuit 270. Thereby, the data I/F circuit 270 transmits the right display moving-image data input from the moving-image codec circuit 230 to the image processing apparatus 10. Then, the data I/F circuit 170 receives the right display moving-image data transmitted from the data I/F circuit 270 provided in the image processing apparatus 20 and outputs the received right display moving-image data to the display processing circuit 160.

For example, first, the media I/F circuit 150 outputs the right-half moving-image data of the MPEG moving-image data having the 4K2K resolution read from the recording medium 4 to the data I/F circuit 170, the data I/F circuit 170 transmits the right-half moving-image data to the image processing apparatus 20, and the data I/F circuit 270 receives the right-half moving-image data to output the received right-half moving-image data to the moving-image codec circuit 230. Then, the moving-image codec circuit 130 outputs the right display moving-image data generated by performing the MPEG decompression process on the right-half moving-image data of the MPEG moving-image data input from the data I/F circuit 270 to the data I/F circuit 270, the data I/F circuit 270 transmits the right display moving-image data to the image processing apparatus 20, and the data I/F circuit 170 receives the right display moving-image data to output the right display moving-image data to the display processing circuit 160.

Thereby, in the $1A^{th}$ reproduction operation, the display processing circuit 160 combines the left display moving-image data input from the moving-image codec circuit 130 with the right display moving-image data input from the moving-image codec circuit 230 via the data I/F circuit 270 and the data I/F circuit 170 to perform the display process on the combined data, and outputs the moving-image data after the processing by the display processing circuit to the connected display device 5, thereby causing the display device 5 to display the moving-image data. For example, the display processing circuit 160 performs the display process on display moving-image data having the 4K2K resolution obtained by combining the left display moving-image data input from the moving-image codec circuit 130 with the right display moving-image data input from the data I/F circuit 170 and then outputs the display process result to the display device 5, thereby causing the display device 5 to display the display process result.

In this manner, in the $1A^{th}$ reproduction operation, the two image processing apparatuses 10 and 20 having moving-image codecs corresponding to the moving image having a lower resolution than the high-resolution moving image provided in the moving-image recording/reproduction apparatus 1 cooperatively perform image processing in parallel so as to cause the display device 5 corresponding to the high-resolution image connected to the moving-image recording/reproduction apparatus 1 to display the display moving-image data according to the high-resolution moving image recorded on the recording medium 4. For example, the two image processing apparatuses 10 and 20 having moving-image codecs corresponding to a moving image having the full HD (1920×1080) resolution cooperatively perform image processing on the moving image of the left-half region of the MPEG moving-image data recorded on the recording medium 4 and image processing on the moving image of the right-half region in parallel so as to cause the display device 5 to display a moving image having the 4K2K (3840×2160) resolution.

As described above, in the moving-image recording/reproduction apparatus 1, the image processing apparatuses 10 and 20 having similar configurations cooperatively operate in parallel so as to record the low-resolution moving image of the same angle of view on the recording medium 4 simultaneously with recording the high-resolution moving image captured by the imaging circuit 2 on the recording medium 4. Thereby, in the moving-image recording/reproduction apparatus 1, it is possible to appropriately select any one of pieces of the moving-image data used for recording that is recorded on the recording medium 4 according to the resolution of an image corresponding to the connected display device 5 and cause the display moving image to be displayed according to the resolution of the image corresponding to the display device 5. At this time, when the display device 5 for displaying the low-resolution image is connected to the moving-image recording/reproduction apparatus 1, it is possible to generate the display moving-image data to be displayed on the display device 5 in only one image processing apparatus (the image processing apparatus 10 in the first reproduction operation) by reading the moving-image data used for recording that corresponds to the low-resolution moving image from the recording medium 4. That is, in the moving-image recording/reproduction apparatus 1, it is possible to display the low-resolution moving image corresponding to the high-resolution moving image without performing conversion from the high-resolution moving image into the low-resolution moving image and transmission/reception of moving-image data to/from each image processing apparatus as in the case in which the conventional technology is applied to the moving-image recording/reproduction apparatus. Thereby, in the moving-image recording/reproduction apparatus 1, it is possible to shorten a delay time when the low-resolution moving image is displayed on the display device 5.

In addition, when the display device 5 for displaying the low-resolution image is connected to the moving-image recording/reproduction apparatus 1, it is possible to set the other image processing apparatus (corresponding to the image processing apparatus 20 in the first reproduction operation), which does not generate the display moving-image data, to a low power consumption mode such as a standby mode or a sleep mode because it is possible to generate the display moving-image data in only one image processing apparatus. In addition, for example, it is possible to set a power-supply OFF state by controlling the supply of power to the other image processing apparatus that does not generate the display moving-image data. Thereby, in the moving-image recording/reproduction apparatus 1, it is possible to implement low power consumption when the low-resolution moving image is displayed on the display device 5.

In the moving-image recording/reproduction apparatus 1, the JPEG processing circuit 140 provided in the image processing apparatus 10 is configured to generate motion JPEG type moving-image data as moving-image data used for recording based on the low-resolution moving image having the same angle of view as the high-resolution moving image. However, a method of generating the moving-image data used for recording based on the low-resolution moving image is not limited to a method using the JPEG processing circuit 140. For example, when there is a margin in a process in which the moving-image codec circuit 130 provided in the image processing apparatus 10 generates the moving-image data used for recording based on the high-resolution moving image, the moving-image codec circuit 130 can be configured to perform the generation of the moving-image data used for recording based on the high-resolution moving image and the generation of the moving-image data used for recording based on the low-resolution moving image. In this case, the moving-image compression process (encoding) or the moving-image decompression process (decoding) in the moving-image codec circuit 130 is time-divided. Also, in the following description, the moving-image compression process (encoding) and the moving-image decompression process (decoding) are collectively referred to as "moving-image processing."

Figure 5:
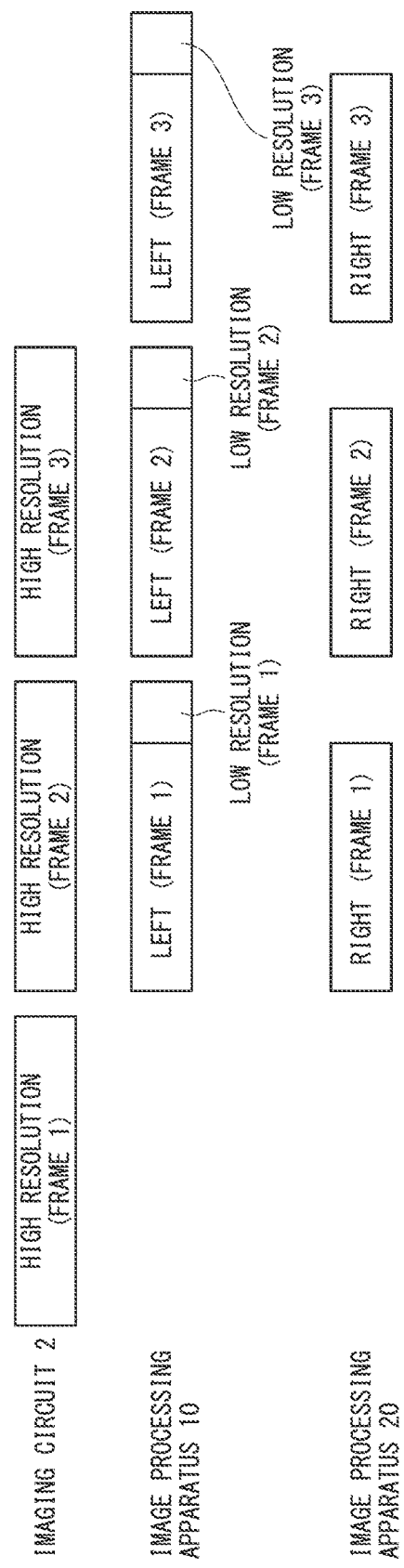
FIG. 5 is a diagram schematically showing an example of timing of an operation of processing the moving image in time division in the moving-image recording/reproduction apparatus of this embodiment.

Next, in the moving-image recording/reproduction apparatus 1 of this embodiment, the moving-image codec circuit 130 provided in the image processing apparatus 10 generates the moving-image data used for recording based on the high-resolution moving image and the moving-image data used for recording based on the low-resolution moving image in a time division manner. That is, an operation in which the moving-image codec circuit 130 performs the moving-image processing in the time division manner will be described. FIG. 5 is a diagram schematically showing an example of the timing of an operation of processing the moving image in the time division manner in the moving-image recording/reproduction apparatus 1 of this embodiment. In FIG. 5, timing of a process in which the image processing apparatuses 10 and 20 configuring the moving-image recording/reproduction apparatus 1 generate moving-image data of each frame in the high-resolution moving image and the low-resolution moving image when image signals of three frames have been input from the imaging circuit 2 to the moving-image recording/reproduction apparatus 1 are showed. In particular, the timing at which the moving-image codec circuit 130 and the moving-image codec circuit 230 perform the moving-image compression process (encoding) are showed in FIG. 5.

As showed in FIG. 5, the imaging circuit 2 sequentially outputs image signals of frames in the order of frame 1, frame 2, and frame 3. Then, each of the image processing apparatuses 10 and 20 generates a high-resolution moving image of a corresponding region for every frame. At this time, in the image processing apparatus 10, the generation of a high-resolution moving image and the generation of a low-resolution moving image corresponding to a left-half region of the high-resolution moving image input from the imaging circuit 2 are performed in the time division manner. In FIG. 5, the timing at which the moving-image codec circuit 130 provided in the image processing apparatus 10 first generates the high-resolution moving image and subsequently generates the low-resolution moving image is showed.

More specifically, the moving-image codec circuit 130 generates a moving image of low resolution (frame 1) subsequent to a moving image of high resolution (frame 1) of a left half according to an image signal of frame 1 initially input from the imaging circuit 2. Subsequently, the moving-image codec circuit 130 generates a moving image of low resolution (frame 2) subsequent to a moving image of high resolution (frame 2) of a left half according to an image signal of second frame 2 input from the imaging circuit 2. Further, the moving-image codec circuit 130 generates a moving image of low resolution (frame 3) subsequent to the moving image of high resolution (frame 3) of a left half according to an image signal of third frame 3 input from the imaging circuit 2

In this manner, the moving-image codec circuit 130 sequentially generates the high-resolution moving image and the low-resolution moving image corresponding to the left-half region for every frame sequentially input from the imaging circuit 2 in the time division manner. Also, although the timing at which the high-resolution moving image corresponding to the right-half region of the high-resolution moving image input from the imaging circuit 2 is generated by the moving-image codec circuit 230 provided in the image processing apparatus 20 in FIG. 5, detailed description related to operation timing of the moving-image codec circuit 230 will be omitted because the moving-image codec circuit 230 merely generates the high-resolution moving image of the right half.

Also, although the case in which moving-image processing is time-divided so that the low-resolution moving image is generated after the high-resolution moving image is generated is showed in FIG. 5, a method of performing the moving-image processing in the time division manner is not limited to the time-division method showed in FIG. 5. For example, it is possible to perform time division so that a process of generating the high-resolution moving image and a process of generating the low-resolution moving image are alternately performed in the same frame.

Here, the operation of the moving-image recording/reproduction apparatus 1 of this embodiment in which the moving-image codec circuit 130 generates the high-resolution moving image and the low-resolution moving image in a time division manner will be described. Also, even in the following description, a case in which the imaging circuit 2 outputs an image signal having the 4K2K (3840×2160) resolution as the image signal of each frame in the high-resolution moving image to the moving-image recording/reproduction apparatus 1 and the display device 5 is a display device corresponding to a low-resolution image for displaying an image having the VGA (640×480) resolution will be described. In addition, each of the moving-image codec circuit 130 provided in the image processing apparatus 10 and the moving-image codec circuit 230 provided in the image processing apparatus 20 will be described as a moving-image codec corresponding to a moving image having the full HD (1920×1080) resolution smaller than the 4K2K resolution.

Then, a case in which the region of the moving image having the 4K2K resolution of one frame input from the imaging circuit 2 is divided into left and right regions, the image processing apparatus 10 performs image processing on a moving image of the left-half region, and the image processing apparatus 20 performs image processing on a moving image of the right-half region will be described. In addition, a case in which the image processing apparatus 10 generates a low-resolution moving image having the VGA resolution at the same angle of view as the moving image having the 4K2K resolution of one frame input from the imaging circuit 2 will be described.

<Second Recording Operation>

First, the second recording operation in which the moving-image recording/reproduction apparatus 1 records a high-resolution moving image and a low-resolution moving image will be described. In the second recording operation in the moving-image recording/reproduction apparatus 1, as in the first recording operation, each of the moving-image codec circuit 130 provided in the image processing apparatus 10 and the moving-image codec circuit 230 provided in the image processing apparatus 20 generates moving-image data used for recording of a corresponding region in the high-resolution moving image to cause the recording medium 4 to record the generated moving-image data used for recording. In addition, in the second recording operation in the moving-image recording/reproduction apparatus 1, in contrast to the first recording operation, the moving-image codec circuit 130 provided in the image processing apparatus 10 generates moving-image data used for recording that corresponds to the low-resolution moving image by time-dividing a moving-image data generation process and causes the recording medium 4 to record the generated moving-image data used for recording. Also, in this second recording operation, a case in which a moving-image compression process (encoding) to be performed by each of the moving-image codec circuit 130 and the moving-image codec circuit 230 is an MPEG compression process will be described.

Figure 6:
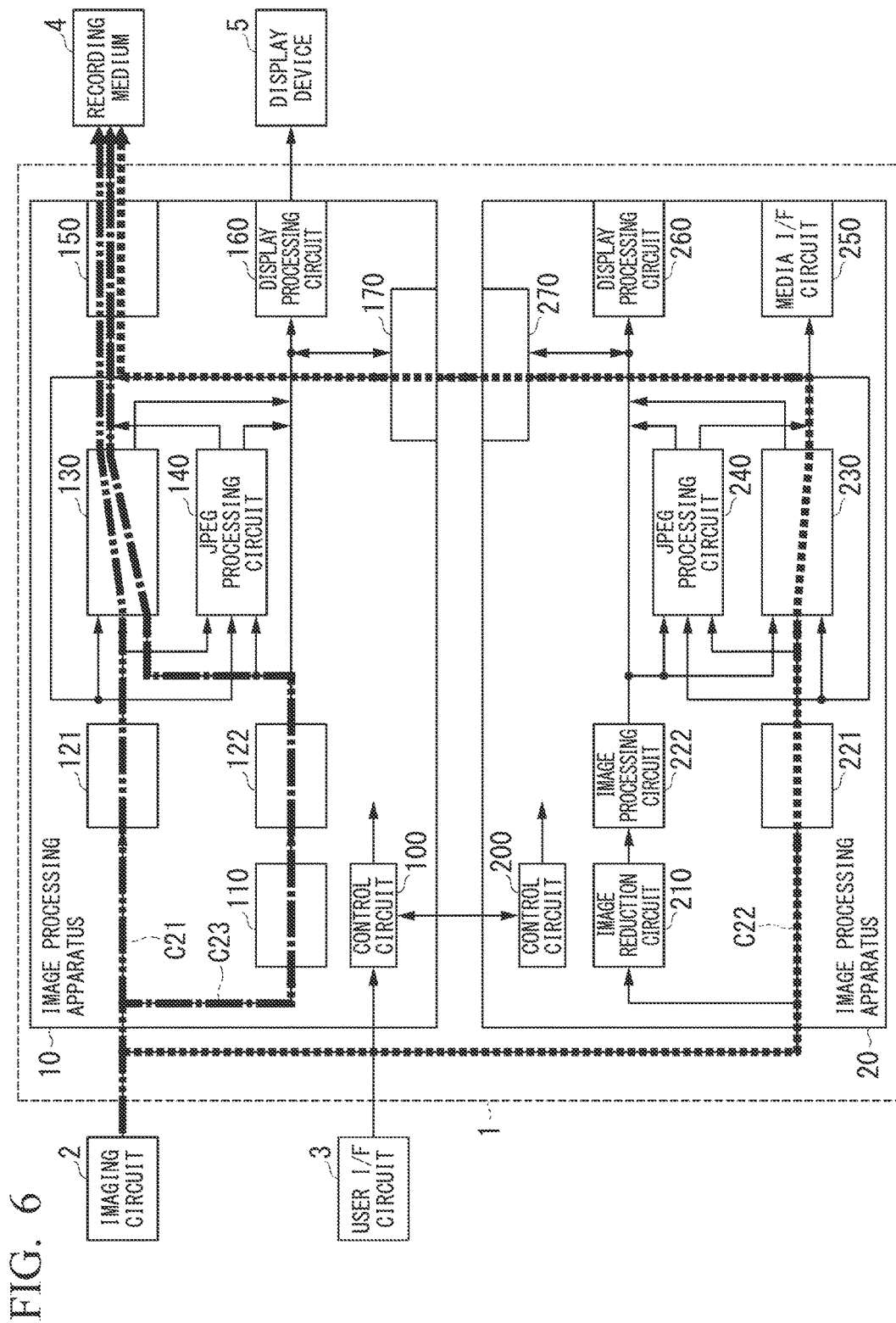
FIG. 6 is a diagram schematically showing an example of a second recording operation of recording the moving image in the moving-image recording/reproduction apparatus of this embodiment.

FIG. 6 is a diagram schematically showing an example of the second recording operation of recording the moving image in the moving-image recording/reproduction apparatus 1 of this embodiment. In FIG. 6, each moving-image data path in this second recording operation is showed on a block diagram of the moving-image recording/reproduction apparatus 1 showed in FIG. 1. Also, in this second recording operation, although the recording medium 4 sequentially records moving-image data used for recording of each frame generated based on an image signal of each frame of the high-resolution moving image input from the imaging circuit 2, processing on the moving image of one frame input from the imaging circuit 2 will be described for ease of description in the following description.

Similar to the first recording operation, the second recording operation also starts when the user of the imaging system equipped with the moving-image recording/reproduction apparatus 1 operates the user I/F circuit 3 to set the operation mode of the imaging system to a moving-image recording mode.

When the operation mode of the imaging system is set to the moving-image recording mode, the user I/F circuit 3 outputs information indicating that the moving-image recording mode has been set through the user's operation to the control circuit 100 provided in the image processing apparatus 10 within the moving-image recording/reproduction apparatus 1 as in the first recording operation, and the control circuit 100 transmits information indicating that the image processing apparatus 20 executes image processing on a right-half region of a high-resolution moving image input from the imaging circuit 2 to the image processing apparatus 20. Then, the control circuit 100 controls an operation of each component provided in the image processing apparatus 10 so as to execute image processing on a left-half region of the high-resolution moving image input from the imaging circuit 2.

In the second recording operation in the image processing apparatus 10, the recording medium 4 records left MPEG moving-image data generated based on the image signal of the left-half region of the high-resolution moving image input from the imaging circuit 2 in the path of the moving-image data in a path C21 showed in FIG. 6. Also, an operation of each component within the image processing apparatus 10 for performing the process in the path of moving-image data in the path C21 in the second recording operation is similar to an operation of each component within the image processing apparatus 10 for performing the process in the path of the moving-image data in the path C11 in the first recording operation. Accordingly, detailed description related to the operation of each component to be performed in the path of the moving-image data in the path C21 will be omitted.

In addition, the control circuit 200 provided in the image processing apparatus 20 controls an operation of each component provided in the image processing apparatus 20 so as to execute image processing on the right-half region of the high-resolution moving image input from the imaging circuit 2 according to information indicating that the image processing is executed transmitted from the control circuit 100 provided in the image processing apparatus 10.

In the second recording operation in the image processing apparatus 20, the recording medium 4 records right MPEG moving-image data generated based on the image signal of the right-half region of the high-resolution moving image input from the imaging circuit 2 in the path of the moving-image data in a path C22 showed in FIG. 6. Also, in the second recording operation, the operation of each component within the image processing apparatus 10 for performing a process through the path of the moving-image data the path C22 is similar to the operation of each component within the image processing apparatus 10 for performing the process through the path of the moving-image data in the path C12 in the first recording operation. Accordingly, detailed description related to the operation of each component to be performed in the path of the moving-image data in the path C22 will be omitted.

In the second recording operation in the image processing apparatus 10, the recording medium 4 records low-resolution MPEG type moving-image data used for recording (hereinafter referred to as "low-resolution MPEG moving-image data") at the same angle of view as the high-resolution moving image input from the imaging circuit 2 through the path of moving-image data in a path C23 showed in FIG. 6 simultaneously with a recording operation of recording the left MPEG moving-image data and the right MPEG moving-image data on the recording medium 4. For example, in the second recording operation in the image processing apparatus 10, the recording medium 4 records the low-resolution MPEG moving-image data having the VGA resolution at the same angle of view as the moving image having the 4K2K resolution input from the imaging circuit 2 on the recording medium 4 through the path of the moving-image data in the path C23.

More specifically, first, the image reduction circuit 110 outputs an image signal of a low-resolution moving image having a smaller number of pixels at the same angle of view as a high-resolution moving image generated by performing a resizing process, for example, such as a thinning process, on an image signal of the high-resolution moving image input from the imaging circuit 2 to the image processing circuit 122 as in the first recording operation. Thereby, similar to the image processing circuit 121, the image processing circuit 122 outputs image data of the low-resolution moving image generated by performing various types of image processing such as noise cancellation and YC conversion processing on the image signal of the low-resolution moving image input from the image reduction circuit 110 to the moving-image codec circuit 130. Subsequently, the moving-image codec circuit 130 generates a low-resolution MPEG moving-image data by performing an MPEG compression process (encoding) on the image data of the low-resolution moving image input from the image processing circuit 122 and outputs the generated low-resolution MPEG moving-image data to the media I/F circuit 150. At this time, the moving-image codec circuit 130 performs a process of generating the low-resolution MPEG moving-image data and a process of generating left MPEG moving-image data in a time division manner.

For example, first, the image reduction circuit 110 outputs an image signal of a moving image having the VGA resolution generated by performing a resizing process on the image signal of the moving image having the 4K2K resolution input from the imaging circuit 2 to the image processing circuit 122, and the image processing circuit 122 outputs image data of the moving image having the VGA resolution generated by performing image processing on the image signal of the moving image having the VGA resolution input from the image reduction circuit 110 to the moving-image codec circuit 130. Then, the moving-image codec circuit 130 outputs low-resolution MPEG moving-image data generated by performing the MPEG compression process on the image data of the moving image having the VGA resolution input from the image processing circuit 122 to the media I/F circuit 150.

Thereby, in the second recording operation, as in the first recording operation, the media I/F circuit 150 combines the left MPEG moving-image data input from the moving-image codec circuit 130 with the right MPEG moving-image data input from the data I/F circuit 170, and causes the recording medium 4 to record the combined data as moving-image data used for recording (hereinafter referred to as "high-resolution MPEG moving-image data") in the high-resolution moving image input from the imaging circuit 2. In addition, the media I/F circuit 150 causes the recording medium 4 to record the low-resolution MPEG moving-image data input from the moving-image codec circuit 130 as the low-resolution moving-image data used for recording that corresponds to the high-resolution moving image input from the imaging circuit 2. For example, the media I/F circuit 150 causes the recording medium 4 to record the high-resolution MPEG moving-image data having the 4K2K resolution obtained by combining the left MPEG moving-image data input from the moving-image codec circuit 130 with the right MPEG moving-image data input from the data I/F circuit 170 and causes the recording medium 4 to record the low-resolution MPEG moving-image data having the VGA resolution input from the moving-image codec circuit 130. At this time, the media I/F circuit 150 associates the high-resolution MPEG moving-image data with the low-resolution MPEG moving-image data and the associated data is recorded on the recording medium 4.

In this manner, in the second recording operation, as in the first recording operation, the two image processing apparatuses 10 and 20 having moving-image codecs corresponding to the moving image having a lower resolution than the high-resolution moving image provided in the moving-image recording/reproduction apparatus 1 cooperatively perform image processing in parallel so as to record the moving-image data used for recording in the high-resolution moving image on the recording medium 4. In addition, in the second recording operation, the image processing apparatus 10 performs image processing on the low-resolution moving image having the same angle of view as the high-resolution moving image input from the imaging circuit 2 in a time division manner with image processing on the high-resolution moving image to record the moving-image data used for recording in the low-resolution moving image having the same angle of view as the high-resolution moving image on the recording medium 4. For example, the two image processing apparatuses 10 and 20 having moving-image codecs corresponding to a moving image having the full HD (1920×1080) resolution cooperatively perform image processing on the left-half region of the high-resolution moving image input from the imaging circuit 2 and image processing on the right-half region in parallel so as to record moving-image data having the 4K2K (3840×2160) resolution on the recording medium 4 as in the first recording operation. In addition, the image processing apparatus 10 performs image processing on the moving image having the VGA resolution at the same angle of view as the moving image having the 4K2K resolution input from the imaging circuit 2 in a time division manner to record the moving-image data having the VGA resolution at the same angle of view as the moving image having the 4K2K resolution on the recording medium 4.

Thereby, when the display device 5 for displaying the image having the VGA resolution is connected in the moving-image recording/reproduction apparatus 1, it is possible to cause the connected display device 5 to display the moving image having the VGA resolution corresponding to the recorded moving image having the 4K2K resolution without performing conversion from the recorded moving image having the 4K2K resolution into the moving image having the VGA resolution.

In addition, in the second recording operation, the image processing apparatuses (image processing apparatuses 10 and 20) configuring the moving-image recording/reproduction apparatus 1 can record the high-resolution moving-image data and the low-resolution moving-image data on the recording medium 4, for example, even when there is no JPEG processing circuit corresponding to a still image.

Also, the case in which a process of generating the moving-image data in the moving-image codec circuit 13 provided in the image processing apparatus 10 is time-divided and the high-resolution moving-image data and the low-resolution moving-image data are generated and recorded on the recording medium 4 has been described in the second recording operation. However, a method of generating the low-resolution moving-image data by the moving-image codec circuit 130 is not limited to a time division process.

For example, in some cases, a time for generating the low-resolution moving-image data can be secured by adjusting a margin time of a process of generating the high-resolution moving-image data in each of the moving-image codec circuit 130 provided in the image processing apparatus 10 and the moving-image codec circuit 230 provided in the image processing apparatus 20. In this case, for example, it is possible to make a configuration in which a process of generating the moving-image data is time-divided in each of the moving-image codec circuits 130 and 230 and the generation of the low-resolution moving-image data corresponding to each of left and right regions into which the region of the moving image having the VGA resolution of one frame is divided is performed by each of the moving-image codec circuit 130 and the moving-image codec circuit 230. More specifically, for example, the moving-image codec circuit 130 generates low-resolution moving-image data corresponding to the left-half region in a margin time of the process of generating the high-resolution moving-image data and the moving-image codec circuit 230 generates low-resolution moving-image data corresponding to the right-half region in a margin time of the process of generating the high-resolution moving-image data. Thereby, likewise, it is possible to generate the high-resolution moving-image data and the low-resolution moving-image data.

In addition, for example, it is possible to make a configuration in which each of the moving-image codec circuits 130 and 230 (non-uniformly) changes a percentage of the process of generating the high-resolution moving image and a process of generating the moving-image data in either moving-image codec circuit having a smaller percentage at which the high-resolution moving-image data is generated is time-divided. More specifically, for example, it is possible to make a configuration in which the moving-image codec circuit 130 performs the generation of the high-resolution moving-image data corresponding to a left region of 40% of the moving image having the 4K2K resolution of one frame and the generation of the low-resolution moving-image data in a time division manner, and the moving-image codec circuit 230 performs the generation of the high-resolution moving-image data corresponding to the right region of 60% of the moving image having the 4K2K resolution of one frame. However, in this case, it is desirable to determine a percentage at which a process in which each moving-image codec circuit generates the high-resolution moving-image data is performed so that only either the moving-image codec circuit 130 or 230 can generate the low-resolution moving-image data. Thereby, it is desirable to reduce power consumption of the moving-image recording/reproduction apparatus 1.

<Second Reproduction Operation>

Next, the second reproduction operation in which the moving-image recording/reproduction apparatus 1 reproduces the low-resolution moving image will be described. In the second reproduction operation in which the moving-image recording/reproduction apparatus 1 reproduces the low-resolution moving image, the moving-image codec circuit 130 provided in the image processing apparatus 10 generates display moving-image data according to MPEG type low-resolution moving-image data used for recording that is recorded on the recording medium 4 and causes the display device 5 to display the generated moving-image data.

Figure 7:
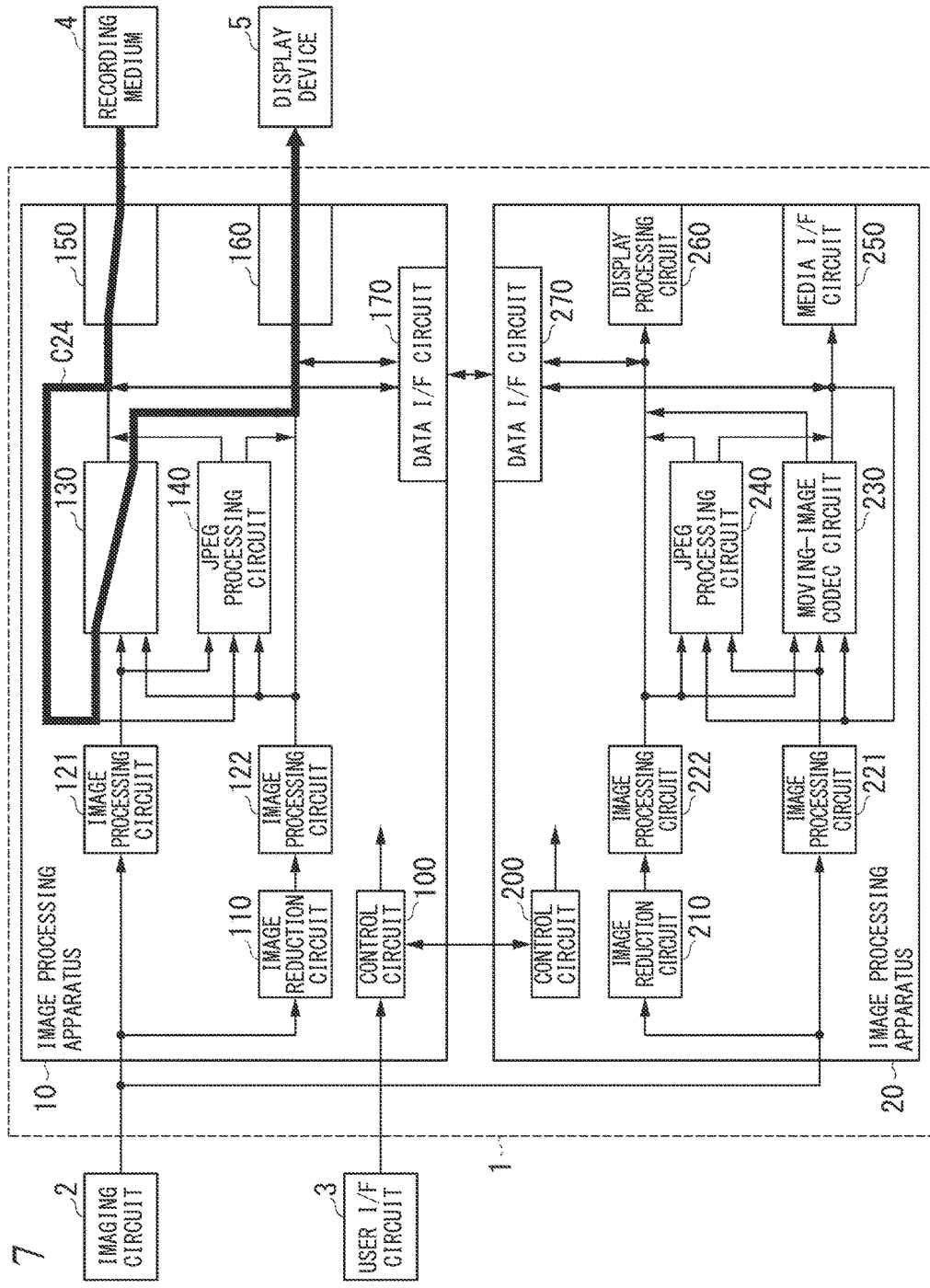
FIG. 7 is a diagram schematically showing an example of a second reproduction operation of reproducing the moving image in the moving-image recording/reproduction apparatus of this embodiment.

FIG. 7 is a diagram schematically showing an example of the second reproduction operation of reproducing the moving image in the moving-image recording/reproduction apparatus 1 of this embodiment. In FIG. 7, each moving-image data path in this second reproduction operation is showed on the block diagram of the moving-image recording/reproduction apparatus 1 showed in FIG. 1. Also, in this second reproduction operation, although the display device 5 sequentially displays display moving-image data generated based on moving-image data used for recording of each frame of the low-resolution MPEG moving-image data recorded on the recording medium 4, processing on the low-resolution MPEG moving-image data of one frame input from the recording medium 4 will be described for ease of description in the following description.

Similar to the first reproduction operation, the second reproduction operation also starts when the user of the imaging system equipped with the moving-image recording/reproduction apparatus 1 operates the user I/F circuit 3 to set the operation mode of the imaging system to a moving-image reproduction mode.

When the operation mode of the imaging system is set to the moving-image reproduction mode, the user I/F circuit 3 outputs information indicating that the moving-image reproduction mode has been set to the control circuit 100 provided in the image processing apparatus 10 within the moving-image recording/reproduction apparatus 1 as in the first reproduction operation. Thereby, the control circuit 100 reads the low-resolution MPEG moving-image data from the recording medium 4 and controls an operation of each component provided in the image processing apparatus 10 so as to execute image processing on the read low-resolution MPEG moving-image data. Also, because the display device 5 connected to the moving-image recording/reproduction apparatus 1 is a display device corresponding to a low-resolution image for displaying an image of a VGA resolution, the control circuit 100 does not transmit information related to the moving-image reproduction mode to the image processing apparatus 20 as in the first reproduction operation.

In the second reproduction operation in the image processing apparatus 10, the display device 5 displays the display moving-image data generated based on the low-resolution MPEG moving-image data read from the recording medium 4 through the path of the moving-image data in a path C24 showed in FIG. 7. For example, in the second reproduction operation in the image processing apparatus 10, the display device 5 displays the display moving-image data having the VGA resolution generated based on the low-resolution MPEG moving-image data having the VGA resolution read from the recording medium 4 through the path of the moving-image data in the path C24.

More specifically, first, the media I/F circuit 150 reads the low-resolution MPEG moving-image data recorded on the recording medium 4 and outputs the read low-resolution MPEG moving-image data to the moving-image codec circuit 130. Subsequently, the moving-image codec circuit 130 generates display moving-image data by performing an MPEG decompression process (decoding) on the low-resolution MPEG moving-image data input from the media I/F circuit 150 and outputs the generated display moving-image data to the display processing circuit 160. Thereby, the display processing circuit 160 performs a display process on the display moving-image data input from the moving-image codec circuit 130 and outputs the display image data after the processing by the display processing circuit to the connected display device 5, thereby causing the connected display device 5 to display the display image data.

For example, first, the media I/F circuit 150 reads the low-resolution MPEG moving-image data having the VGA resolution recorded on the recording medium 4 and outputs the read low-resolution MPEG moving-image data to the moving-image codec circuit 130. Subsequently, the moving-image codec circuit 130 outputs display moving-image data having the VGA resolution generated by performing the MPEG decompression process on the low-resolution MPEG moving-image data having the VGA resolution input from the media I/F circuit 150, to the display processing circuit 160. Thereby, the display processing circuit 160 outputs display image data after the display process is performed on the display moving-image data having the VGA resolution input from the moving-image codec circuit 130 to the display device 5, thereby causing the display device 5 to display the display image data.

In this manner, in the second reproduction operation, as in the first reproduction operation, one image processing apparatus (image processing apparatus 10) provided in the moving-image recording/reproduction apparatus 1 performs image processing to cause the display device 5 corresponding to the low-resolution image to display the display moving-image data according to the low-resolution moving image having a smaller number of pixels at the same angle of view as the high-resolution moving image. For example, the image processing apparatus 10 reads the moving-image data having the VGA resolution recorded on the recording medium 4 in association with the moving-image data having the 4K2K (3840×2160) resolution to perform the image processing on the moving-image data and therefore the display device 5 displays the moving image having the VGA resolution in only the image processing apparatus 10.

In this manner, even in the second reproduction operation, when the display device 5 for displaying the image having the VGA resolution is connected in the moving-image recording/reproduction apparatus 1, it is possible to cause the connected display device 5 to display the moving image having the VGA resolution without performing conversion into the display moving-image data in the moving image having the VGA resolution corresponding to the recorded moving-image data having the 4K2K resolution.

An operation in which the image processing apparatuses 10 and 20 cooperatively operate in parallel so as to cause the display moving-image data according to the high-resolution MPEG moving image recorded on the recording medium 4 to be displayed in the second reproduction operation is similar to the $1A^{th}$ reproduction operation showed in FIG. 4. Accordingly, detailed description related to the operation of each component when the display moving-image data according to the high-resolution MPEG moving-image data is displayed will be omitted.

As described above, in the moving-image recording/reproduction apparatus 1, even in the second recording operation, the image processing apparatuses 10 and 20 having similar configurations cooperatively operate in parallel so as to record the low-resolution moving image at the same angle of view on the recording medium 4 simultaneously with recording the high-resolution moving image captured by the imaging circuit 2 on the recording medium 4. Thereby, even in the second reproduction operation, in the moving-image recording/reproduction apparatus 1, it is possible to appropriately select any one of pieces of the moving-image data used for recording that is recorded on the recording medium 4 according to the resolution of an image that can be displayed by the connected display device 5 and cause the display moving image to be displayed according to the resolution of the image corresponding to the display device 5. Thereby, even in the second reproduction operation, in the moving-image recording/reproduction apparatus 1, it is possible to shorten a delay time and reduce power consumption when the low-resolution moving image is displayed on the display device 5.

According to this embodiment, a moving-image recording/reproduction apparatus (moving-image recording/reproduction apparatus 1) includes a first image processing apparatus (image processing apparatus 10) which is an image processing apparatus configured to divide a region of an image signal into a first region (left region) and a second region (right region) when the image signal of each frame in a high-resolution moving image is input and generate first moving-image data (left MPEG moving-image data) obtained by performing moving-image processing (MPEG compression process (encoding)) on the image signal of the first region; and a second image processing apparatus (image processing apparatus 20) which is an image processing apparatus configured to generate second moving-image data (right MPEG moving-image data) obtained by performing the moving-image processing (MPEG compression process (encoding)) on the image signal of the right region, wherein high-resolution moving-image data corresponding to the high-resolution moving-image (MPEG moving-image data or high-resolution MPEG moving-image data) obtained by combining the left MPEG moving-image data and the right MPEG moving-image data and low-resolution moving-image data (motion JPEG moving-image data or low-resolution MPEG moving-image data) corresponding to a low-resolution moving image having the same angle of view as the high-resolution moving image generated by at least one of the image processing apparatus 10 and the image processing apparatus 20 are associated and recorded, and wherein either the recorded high-resolution moving-image data (MPEG moving-image data or high-resolution MPEG moving-image data) or low-resolution moving-image data (motion JPEG moving-image data or low-resolution MPEG moving-image data) is selected according to image resolution that can be displayed by a connected display device (display device 5).

In addition, according to this embodiment, the moving-image recording/reproduction apparatus 1 is configured so that, when the moving image (display moving image) based on the low-resolution moving-image data (motion JPEG moving-image data or low-resolution MPEG moving-image data) is displayed on the display device 5, the moving image (display moving-image data) based on the low-resolution moving-image data (motion JPEG moving-image data or low-resolution MPEG moving-image data) is generated to be displayed on the display device 5 through either the image processing apparatus 10 or the image processing apparatus 20.

In addition, according to this embodiment, the moving-image recording/reproduction apparatus 1 is configured such that a region of the image signal is divided into the left region and the right region at predetermined percentages and the image processing apparatus 10 and the image processing apparatus 20 perform the moving-image processing (MPEG compression process (encoding)) on the image signal of a corresponding region in parallel.

In addition, according to this embodiment, the moving-image recording/reproduction apparatus 1 is configured so that the image processing apparatus, which also generates the low-resolution moving-image data (motion JPEG moving-image data or low-resolution MPEG moving-image data), generates the low-resolution moving-image data (motion JPEG moving-image data or low-resolution MPEG moving-image data) based on an image signal obtained by reducing the number of pixels from the image signal in the high-resolution moving image after the moving-image processing (MPEG compression process (encoding)) to be performed on the image signal of the corresponding region ends.

In addition, according to this embodiment, the moving-image recording/reproduction apparatus 1 is configured so that when the percentages at which the region of the image signal is divided into the left region and the right region is set to be non-uniform, the image processing apparatus corresponding to a region having a smaller number of image signals included in the divided region generates the low-resolution moving-image data (motion JPEG moving-image data or low-resolution MPEG moving-image data) based on an image signal obtained by reducing the number of pixels from the image signal in the high-resolution moving image.

In addition, according to this embodiment, the moving-image recording/reproduction apparatus 1 is configured so that only one of the image processing apparatus 10 and the image processing apparatus 20 determines the percentages at which the region of the image signal is divided into the left region and the right region so as to generate the low-resolution moving-image data (motion JPEG moving-image data or low-resolution MPEG moving-image data).

As described above, according to the embodiments of the present invention, the two image processing apparatuses having similar configurations configuring the moving-image recording/reproduction apparatus cooperatively operate in parallel and therefore the low-resolution moving image having the same angle of view corresponding to the high-resolution moving image is recorded simultaneously with recording the high-resolution moving image. Thereby, in the embodiments of the present invention, it is possible to appropriately select either the recorded high-resolution moving-image data or low-resolution moving-image data according to the resolution of an image corresponding to the display device connected to the moving-image recording/reproduction apparatus and cause the selected moving image to be displayed according to the resolution of the image corresponding to the display device. At this time, in the embodiments of the present invention, when the display device for displaying the low-resolution image is connected to the moving-image recording/reproduction apparatus 1, only one image processing apparatus (the image processing apparatus 10 in this embodiment) performs a process of displaying the low-resolution moving image. That is, in the embodiments of the present invention, the moving-image recording/reproduction apparatus can display the low-resolution moving image corresponding to the high-resolution moving image without performing conversion from the high-resolution moving image into the low-resolution moving image or transmission/reception to/from each image processing apparatus as in the case in which the conventional technology is applied to the moving-image recording/reproduction apparatus. Thereby, in the embodiments of the present invention, the moving-image recording/reproduction apparatus can shorten a delay time when the low-resolution moving image is displayed on the display device.

In addition, when the display device for displaying the low-resolution image is connected to the moving-image recording/reproduction apparatus in the embodiments of the present invention, it is possible to set the other image processing apparatus (corresponding to the image processing apparatus 20 in the embodiment), which does not perform a process of displaying the low-resolution moving-image data, to a low power consumption mode because a process of displaying the low-resolution moving image can be performed in only one image processing apparatus (the image processing apparatus 10 in the embodiments). Thereby, in the embodiments of the present invention, the moving-image recording/reproduction apparatus can reduce power consumption when the low-resolution moving image is displayed on the display device.

Also, although the case in which the image processing apparatuses 10 and 20 configuring the moving-image recording/reproduction apparatus 1 are image processing apparatuses having the same configuration has been described in this embodiment, the components of the image processing apparatus 10 and the components of the image processing apparatus 20 configuring the moving-image recording/reproduction apparatus 1 are not limited to the embodiments of the present invention and the moving-image recording/reproduction apparatus may be constituted of image processing apparatuses having different components. For example, in this embodiment, the image processing apparatus 20 configuring the moving-image recording/reproduction apparatus 1 may be a configuration in which the image reduction circuit 210, the image processing circuit 222, the JPEG processing circuit 240, the media I/F circuit 250, and the display processing circuit 260 are not provided.

In addition, for example, although the case in which the image processing circuits 121 and 122 provided in the image processing apparatus 10 configuring the moving-image recording/reproduction apparatus 1 are image processing circuits for performing similar image processing on image signals has been described in this embodiment, the image processing to be performed on the image signal by each of the image processing circuits 121 and 122 is not limited to the embodiments of the present invention and may be different image processing. For example, the image processing circuit 122 may be an image processing circuit for performing image processing according to a so-called live view function of causing the display device 5 to display a moving image for identifying an object to be photographed in an imaging system equipped with the moving-image recording/reproduction apparatus 1 of this embodiment.

In addition, although the configuration in which the display device 5 is connected to the image processing apparatus 10 configuring the moving-image recording/reproduction apparatus 1 has been described in this embodiment, the image processing apparatus connected to the display device 5 is not limited to the embodiments of the present invention and the display device(s) may be configured to be connected to the image processing apparatus 20 or both of the image processing apparatuses 10 and 20. Then, when the display devices are connected to both of the image processing apparatuses 10 and 20, the resolutions of images corresponding to the display devices connected to the image processing apparatuses may be different. For example, this may have a configuration in which the display device 5 corresponding to a low-resolution image for displaying an image having the VGA resolution may be connected to the image processing apparatus 10 and the display device corresponding to a high-resolution image for displaying an image having the 4K2K resolution may be connected to the image processing apparatus 20.

In addition, in this embodiment, the configuration in which the components provided in the image processing apparatuses 10 and 20 configuring the moving-image recording/reproduction apparatus 1 are directly connected has been described. That is, a configuration in which an output of a previous-stage component is directly input to a subsequent-stage component has been described. However, a connection between the components configuring the moving-image recording/reproduction apparatus is not limited to the embodiments of the present invention. For example, it is possible to make a configuration in which the components provided in the image processing apparatuses 10 and 20 configuring the moving-image recording/reproduction apparatus are connected to a bus and image data (image signals or moving-image data) to be processed is exchanged through direct memory access (DMA) via a temporary storage memory such as a dynamic random access memory (DRAM) connected to the same bus. In addition, for example, it is possible to make a configuration in which the components provided in the image processing apparatus are connected to the bus within each image processing apparatus configuring the moving-image recording/reproduction apparatus and image data (image signals or moving-image data) to be processed is exchanged through DMA for the DRAM exclusively or commonly connected to each image processing apparatus. Even in the moving-image recording/reproduction apparatus of this configuration, it is possible to perform operations similar to that of the moving-image recording/reproduction apparatus 1 of this embodiment by applying the concept of the present invention. That is, the two moving-image codec circuits cooperatively operate in parallel so as to record the high-resolution moving image and simultaneously the JPEG processing circuit or the moving-image codec circuit can record a low-resolution moving image at the same angle of view corresponding to the high-resolution moving image. Then, according to the resolution of the image corresponding to the display device connected to the moving-image recording/reproduction apparatus of this configuration, it is possible to cause the display device to display the recorded high- or low-resolution moving image.

In addition, the case in which the two image processing apparatuses including the image processing apparatuses 10 and 20 configuring the moving-image recording/reproduction apparatus 1 cooperatively operate in parallel has been described in this embodiment. Then, the case in which the region of the moving image having the 4K2K (3840×2160) resolution of one frame is divided into two regions, the image processing apparatus 10 performs the image processing on the moving image of the left-half region, and the image processing apparatus 20 performs the image processing on the moving image of the right-half region has been described in this embodiment. However, a method of dividing the moving-image region is not limited to the embodiments of the present invention. For example, it is possible to make a configuration in which a region of a moving image having the 4K2K (3840×2160) resolution of one frame is vertically divided into two regions, the image processing apparatus 10 performs image processing on a moving image of an upper-half region, and the image processing apparatus 20 performs image processing on a moving image of a lower-half region. In addition, each percentage of the regions on which the image processing apparatuses 10 and 20 perform image processing can be configured to be different.

In addition, the case in which the two image processing apparatuses including the image processing apparatuses 10 and 20 configuring the moving-image recording/reproduction apparatus 1 cooperatively operate in parallel has been described in this embodiment. However, the number of image processing apparatuses to cooperatively operate in parallel is not limited to the embodiments of the present invention, and more image processing apparatuses can be configured to cooperatively operate in parallel. For example, four image processing apparatuses configuring the moving-image recording/reproduction apparatus can be configured to cooperatively operate in parallel. In this configuration, for example, a region of a moving image having the 4K2K (3840×2160) resolution of one frame is divided into four regions and four image processing apparatuses to cooperatively operate in parallel can be configured to perform image processing on moving images of the regions obtained by division. In this case, a frequency of an operation clock of the moving-image codec provided in each image processing apparatus can be set to a frequency of ¼ of the moving-image codec corresponding to the moving image having the 4K2K resolution. That is, in the embodiments of the present invention, it is possible to reduce a clock frequency at which the components provided in the moving-image recording/reproduction apparatus, that is, reduce the clock frequency to a frequency of (1/the number of image processing apparatuses), by increasing the number of divisions of the region of the moving image of one frame according to the number of image processing apparatuses to cooperatively operate.

In addition, in this embodiment, a case has been described that the two image processing apparatuses including the image processing apparatuses 10 and 20 configuring the moving-image recording/reproduction apparatus 1 cooperatively operate in parallel so as to record a moving image having a higher 4K2K (3840×2160) resolution than that of the moving image having a full HD (1920×1080) resolution to which the moving-image codec circuits (moving-image codec circuits 130 and 230) provided in each image processing apparatus correspond. However, a resolution of the moving image capable of being supported when a plurality of image processing apparatuses configuring the moving-image recording/reproduction apparatus 1 cooperatively operate in parallel is not limited to the embodiments of the present invention. That is, according to the configuration of the image processing apparatus configuring the moving-image recording/reproduction apparatus 1, it is possible to configure a moving-image recording/reproduction apparatus for a moving image having higher definition, that is, a higher resolution, than a moving image having the 4K2K (3840×2160) resolution by applying the concept of the present invention.

In addition, in this embodiment, the configuration in which the resolution of the image capable of being displayed by the display device 5 connected to the moving-image recording/reproduction apparatus 1 is set, that is, the configuration in which it is switched whether to execute image processing after reading either a high-resolution moving image or a low-resolution moving image recorded on the recording medium 4 when the moving image is displayed on the display device 5, is not particularly defined. The switching of moving-image data to be read from the recording medium 4 in the moving-image recording/reproduction apparatus 1, for example, may be configured to be set in advance when the imaging system equipped with the moving-image recording/reproduction apparatus 1 of this embodiment is manufactured or configured to be set by the user operating the user I/F circuit 3 provided in the imaging system. In addition, when the display device has been connected to the moving-image recording/reproduction apparatus 1, the switching of the moving-image data can be configured to be acquired from the connected display device and set.

In addition, in this embodiment, regions into which a region of a moving image is divided are not particularly defined. For the regions into which the region of the moving image is divided, not only the region is simply divided, but also, for example, a so-called overlapping region in which boundary circuits of each region obtained by division overlap each other can be set. Even when the image processing has been separately performed on an image signal or moving-image data of each region obtained by division by setting this overlapping region, it is possible to obscure junctions between the regions obtained by division in display image data after the display process is performed to be displayed on the display device.

While preferred embodiments of the invention have been described and showed above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A moving-image recording/reproduction apparatus comprising:
   a first image processing apparatus which is an image processing apparatus configured to divide a region of an image signal into first and second regions when the image signal of each frame in a high-resolution moving image is input and generate first moving-image data by performing moving-image processing on the image signal of the first region; and
   a second image processing apparatus which is an image processing apparatus configured to generate second moving-image data by performing the moving-image processing on the image signal of the second region,
   wherein high-resolution moving-image data corresponding to the high-resolution moving-image obtained by combining the first and second moving-image data and low-resolution moving-image data corresponding to a low-resolution moving image having the same angle of view as the high-resolution moving image generated by at least one of the first and second image processing apparatuses are associated and recorded, and
   wherein either the recorded high- or low-resolution moving-image data is selected according to an image resolution that is capable of being displayed by a connected display device,
   wherein the moving image based on the low-resolution moving-image data is generated to be displayed on the display device through either the first or the second image processing apparatus, when the moving image based on the low-resolution moving-image data is displayed on the display device,
   wherein a region of the image signal is divided into the first and second regions at predetermined proportions, and
   wherein the first image processing apparatus and the second image processing apparatus perform the moving-image processing on the image signal of a corresponding region in parallel.

2. The moving-image recording/reproduction apparatus according to claim 1, wherein the image processing apparatus, which also generates the low-resolution moving-image data, generates the low-resolution moving-image data based on an image signal obtained by reducing the number of pixels from the image signal in the high-resolution moving image after the moving-image processing to be performed on the image signal of the corresponding region ends.

3. The moving-image recording/reproduction apparatus according to claim 2,
   wherein the proportions at which the region of the image signal is divided into the first and second regions are set to be non-uniform, and
   wherein the image processing apparatus corresponding to a region having a smaller number of image signals included in the first and second regions generates the low-resolution moving-image data based on an image signal obtained by reducing the number of pixels from the image signal in the high-resolution moving image.

4. The moving-image recording/reproduction apparatus according to claim 3, wherein only either the first or the second image processing apparatus determines the proportions at which the region of the image signal is divided into the first and second regions so as to generate the low-resolution moving-image data.

5. The moving-image recording/reproduction apparatus according to claim 1,
   wherein the proportions at which the region of the image signal is divided into the first and second regions are set to be non-uniform, and
   wherein the image processing apparatus corresponding to a region having a smaller number of image signals included in the first and second regions generates the low-resolution moving-image data based on an image signal obtained by reducing the number of pixels from the image signal in the high-resolution moving image.

6. The moving-image recording/reproduction apparatus according to claim 5, wherein only either the first or the second image processing apparatus determines the proportions at which the region of the image signal is divided into the first and second regions so as to generate the low-resolution moving-image data.

* * * * *